US010806231B2

(12) United States Patent
Sato

(10) Patent No.: US 10,806,231 B2
(45) Date of Patent: Oct. 20, 2020

(54) DRAWING APPARATUS, DRAWING METHOD, AND RECORDING MEDIUM STORING PROGRAM

(71) Applicant: CASIO COMPUTER CO., LTD., Shibuya-ku, Tokyo (JP)

(72) Inventor: Ken Sato, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 182 days.

(21) Appl. No.: 16/036,425

(22) Filed: Jul. 16, 2018

(65) Prior Publication Data

US 2019/0021467 A1 Jan. 24, 2019

(30) Foreign Application Priority Data

Jul. 18, 2017 (JP) ................................ 2017-138691
Jun. 20, 2018 (JP) ................................ 2018-116588

(51) Int. Cl.

*G06K 15/22* (2006.01)
*A45D 29/00* (2006.01)
*B41J 3/407* (2006.01)

(52) U.S. Cl.

CPC ............ *A45D 29/004* (2013.01); *B41J 3/407* (2013.01); *A45D 2029/005* (2013.01)

(58) Field of Classification Search

None
See application file for complete search history.

(56) References Cited

U.S. PATENT DOCUMENTS

| | | | | |
|---|---|---|---|---|
| 5,931,166 | A * | 8/1999 | Weber | A45D 29/00 132/73 |
| 6,035,860 | A * | 3/2000 | Mombourquette | A45D 29/00 132/200 |
| 6,286,517 | B1 | 9/2001 | Weber et al. | |
| 6,336,694 | B1 * | 1/2002 | Ishizaka | A45D 29/00 347/105 |
| 6,525,724 | B1 * | 2/2003 | Takami | A45D 29/00 345/418 |
| 7,123,983 | B2 * | 10/2006 | Yogo | A45D 31/00 700/182 |
| 2009/0153604 | A1 * | 6/2009 | Chen | B41J 3/28 347/9 |
| 2009/0213166 | A1 * | 8/2009 | Burke | B41J 2/1753 347/19 |
| 2012/0113171 | A1 * | 5/2012 | Murata | B41J 3/407 347/2 |
| 2012/0287183 | A1 * | 11/2012 | Bitoh | B41J 2/2117 347/3 |
| 2014/0232802 | A1 * | 8/2014 | Bitoh | B41J 2/2117 347/110 |
| 2014/0285798 | A1 * | 9/2014 | Nishimura | G01N 21/8483 356/300 |

(Continued)

FOREIGN PATENT DOCUMENTS

WO 0191598 A1 12/2001

*Primary Examiner* — Ted W Barnes
(74) *Attorney, Agent, or Firm* — Holtz, Holtz & Volek PC

(57) ABSTRACT

A drawing apparatus includes a processor generating data for drawing according to a type of a target on which drawing is performed. The target is placed in a drawable area. The drawing apparatus further includes a drawing head drawing on the target placed in the drawable area on a basis of the data for drawing generated by the processor.

11 Claims, 13 Drawing Sheets

(56) References Cited

U.S. PATENT DOCUMENTS

| | | | | |
|---|---|---|---|---|
| 2015/0020834 | A1* | 1/2015 | Bitoh | A45D 29/00 132/200 |
| 2015/0314141 | A1* | 11/2015 | Choi | A45D 44/00 347/110 |
| 2017/0065053 | A1* | 3/2017 | Nagao | B43L 13/024 |

* cited by examiner

DRAWING APPARATUS, DRAWING METHOD, AND RECORDING MEDIUM STORING PROGRAM

CROSS-REFERENCE TO RELATED APPLICATIONS

This application is based upon and claims the benefit of priority under 35 USC 119 of Japanese Patent Application Nos. 2017-138691 filed on Jul. 18, 2017 and 2018-116588 filed on Jun. 20, 2018, the entire disclosure of which, including the description, claims, drawings, and abstract, is incorporated herein by reference in its entirety.

BACKGROUND OF THE INVENTION

1. Field of the Invention

The present invention relates to a drawing apparatus, a drawing method, and a recording medium storing a program.

2. Description of the Related Art

A drawing apparatus drawing a nail design on a fingernail and the like have been known conventionally (for example, see WO 01/91598 A1).

Such a drawing apparatus draws a nail design and the like selected by a user on a nail set at a predetermined position.

By using such an apparatus, it is possible to apply a nail design to a nail without going to a nail salon.

Some user desires to print the nail design drawn on the nail on a medium for recording such as a sheet or a card, so as to keep for collection or for future reference. Furthermore, some user desires to perform a drawing process not on a nail but on a medium for recording, for example, on a transfer sheet such as a tattoo sheet or on a nail seal. However, it takes time and is troublesome to separately set a medium for recording such as paper for printing after drawing on the nail.

It is an advantage of the present invention to provide a drawing apparatus, a drawing method, and a recording medium for recording a program which realize automatic recognition of a drawing target and a drawing process according to the drawing target.

According to the first aspect of the present invention, there is provided a drawing apparatus including a processor generating data for drawing according to a type of a target on which drawing is performed, the target being placed in a drawable area; and a drawing head drawing on the target placed in the drawable area on a basis of the data for drawing generated by the processor.

According to the second aspect of the present invention, there is provided a drawing method by a drawing apparatus, including: detecting a type of a target on which drawing is performed, the target being placed in a drawable area; generating data for drawing according to the detected type of the target; and drawing on the target detected in the drawable area on a basis of the generated data for drawing.

According to the third aspect of the present invention, there is provided a non-transitory readable recording medium storing a program for causing a processor of a drawing apparatus provided with a drawing head to execute processes of: detecting a type of a target on which drawing is performed, the target being placed in a drawable area; generating data for drawing according to the detected type of the target; and drawing on the target detected in the drawable area on a basis of the generated data for drawing.

DETAILED DESCRIPTION OF THE INVENTION

First Embodiment

Figure 1:
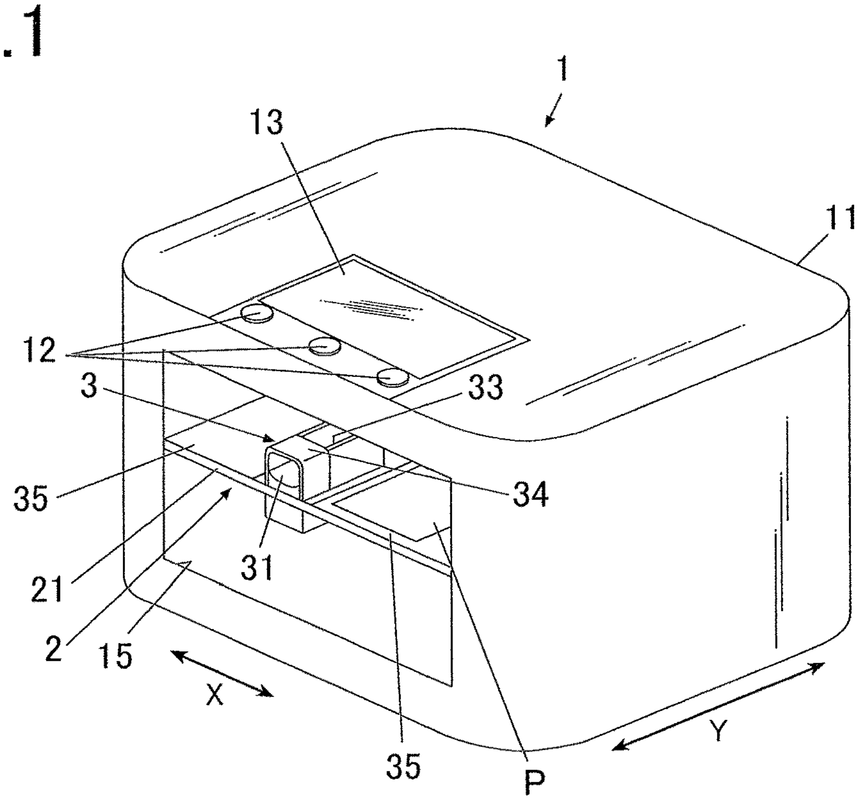
FIG. 1 is a perspective view showing an overall configuration of a nail printing apparatus in the first embodiment.

The first embodiment of a drawing apparatus, a drawing method, and a recording medium for storing a program according to the present invention will now be described with reference to FIG. 1 to FIG. 6C.

The following embodiments involve various technically preferred limitations for accomplishing the present invention. The scope of the invention, however, should not be limited to the embodiments and drawings.

The drawing apparatus according to the present embodiment described below is exemplified by a nail printing apparatus which draws on a nail of a finger as a target on which a drawing process is performed (hereinafter simply referred to as a "target"). The target of the present invention is not limited to a nail of a finger, but may be, for example, a nail of a toe.

Furthermore, the target of the nail printing apparatus according to the present embodiment is not limited to a nail, but may be a medium for recording such as paper.

FIG. 1 is a perspective view showing an outer appearance of the nail printing apparatus in the present embodiment.

As shown in FIG. 1, the nail printing apparatus 1 has a housing 11 formed in a substantially box shape.

An operation unit 12 is disposed on the upper surface (top plate) of the housing 11.

The operation unit 12 is an input receiver to which the user makes various inputs.

As the operation unit 12 is arranged, for example, a power switch button for turning on the power of the nail printing apparatus 1, a stop switch button for stopping the operation, a design selection button for selecting a design image to be drawn on the nail T, a drawing start button for instructing the start of drawing, and operation button(s) for performing various inputs.

A display 13 is disposed on the upper surface (top plate) of the housing 11.

The display 13 is composed of, for example, a liquid crystal display (LCD), an organic electroluminescence display, or other flat display.

In the present embodiment, on the display 13 are suitably displayed, for example, various instructions, a nail image (a finger image including an image of the nail T) obtained by photographing a target finger U1, an image of the outline of the nail T in the nail image, a design selection screen for selecting a design image to be drawn on the nail T, a thumbnail image to confirm the design, instruction screens for displaying various instructions.

A touch panel for performing various inputs may be integrally formed on the surface of the display 13. In this case, the touch panel functions as the operation unit 12.

Furthermore, at the front (in FIG. 1) of the housing 11, an opening 15 is formed so that a target is inserted at the time of drawing by the nail printing apparatus 1 and set at a drawable position where drawing by the drawing unit 40 is possible.

In the present embodiment, as will be described later, a finger (referred to as a "target finger U1") corresponding to the nail T as the target and a medium for recording P (hereinafter, referred to as a "medium P") such as paper are set at the drawable position as a drawing target. The opening 15 is formed in a size (i.e., a width and the like) which does not cause interference when the target finger U1 and the medium P are inserted into and pulled out of the apparatus.

Figure 2:
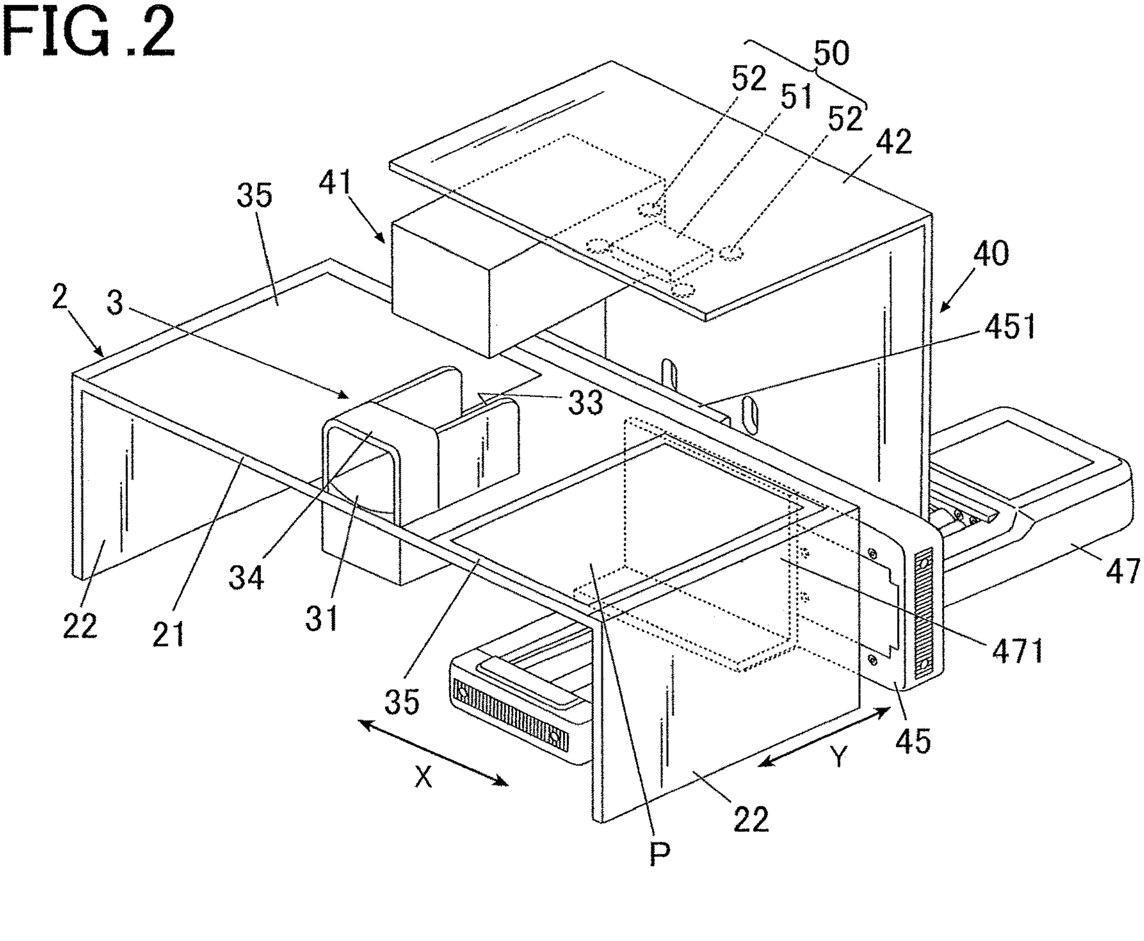
FIG. 2 is a perspective view of essential parts showing an internal configuration of a nail printing apparatus where a housing is removed.

FIG. 2 is a perspective view of essential parts showing the internal configuration of the nail printing apparatus 1, where the housing 11 is removed from the nail printing apparatus 1 of FIG. 1.

As shown in FIG. 2, inside the housing 11 are provided a target holder 2 for holding the nail T of the target finger U1 and the medium P inserted into the apparatus, a drawing unit 40 for drawing on the nail T of the target finger U1 and the medium P, an image capturing unit 50 for photographing the target finger U1, its nail T, and the medium P, and the like.

The target holder 2 is a table-like member extending in the width direction (the X direction in FIG. 1 and FIG. 2) of the nail printing apparatus 1, and has an upper surface plate 21 on which the target is placed, and a pair of legs 22 for holding the upper surface plate 21 at the end portions in the width direction.

In a state in which the target holder 2 is housed in the housing 11, the upper surface plate 21 of the target holder 2 is arranged substantially at the center of the nail printing apparatus 1 in the vertical direction (vertical direction in FIG. 1), and also functions as a partition dividing the space within the opening 15 into an upper portion and a lower portion.

In other words, the space above the upper surface plate 21 in the opening 15 functions as a space for receiving the target (that is, the nail T of the target finger U1 and the medium P). The space below the upper surface plate 21 in the opening 15 functions as a space where, for example, a finger which is not the target (referred to as a non-target finger (not shown)) evacuates.

Figure 3A:
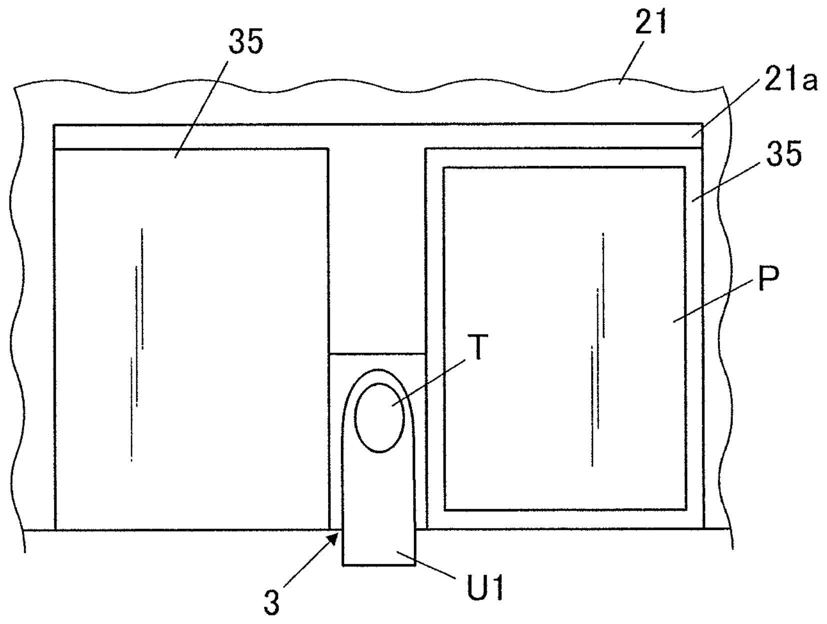
FIG. 3A is a plan view schematically showing a drawable area.
Figure 3B:
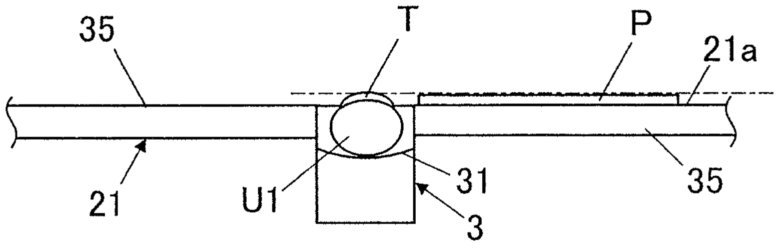
FIG. 3B is a schematic front view of the drawable area.
Figure 3C:
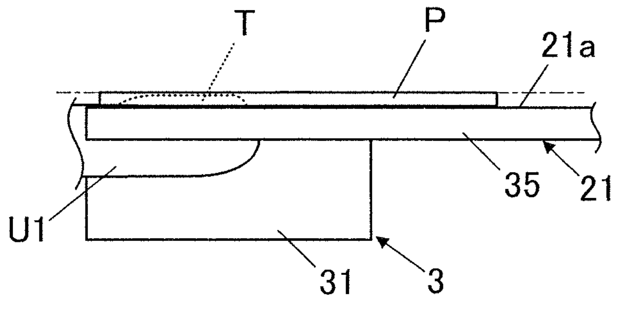
FIG. 3C is a schematic side view showing the drawable area.

FIG. 3A is a plan view schematically showing main configurations of the upper surface plate 21. FIG. 3B is a schematic front view of the upper surface plate 21. FIG. 3C is a schematic side view showing the upper surface plate 21.

As shown in FIG. 3A to FIG. 3C, there is provided a finger fixing unit 3 into which the target finger U1 with a nail T as the target is inserted and fixed, almost at the center in the width direction (X direction in FIG. 1 and FIG. 2) of the region on the upper surface plate 21 where the drawing head 41 of the drawing unit 40 described later (referred to as a "drawable area 21*a*") can perform drawing.

As shown in FIG. 2 and the like, the finger fixing unit 3 is a box-shaped member opening toward the front of the apparatus and has a finger fixing member 32 disposed therein for fixing the target finger U1. The finger fixing member 32 pushes up and holds the target finger U1 from the bottom, and is made of, for example, a flexible resin. The finger fixing member 32 is not particularly limited as long as it can hold the finger to be printed U1 from the bottom. For example, it may be urged from the bottom by an elastic member such as a spring. Alternatively, for example, the finger fixing member 32 may be configured to be expanded or contracted by changing the internal pressure and, in the expanded state, push up and fix the target finger U1.

There is a window 33 opening upward at the back of the top of the finger fixing unit 3. The nail T of the target finger U1 inserted into the finger fixing unit 3 is exposed from the window 33.

The portion at the front of the top of the finger fixing unit 3 is a finger presser 34 for regulating the position of the target finger U1 in the vertical direction. The positions of the target finger U1 and its nail T are determined to be predetermined positions by being held by the finger fixing member 32 from the bottom and by being pressed by the finger presser 34 at the top of the target finger U1.

On the side of the finger fixing unit 3 (the side part in the width direction X of the apparatus in FIG. 2) within the drawable region 21*a*, there are provided medium rests 35 for placing the medium P.

In the present embodiment, the medium rests 35 provided on both sides of the finger fixing unit 3 are illustrated. However, the position, size, and the like are not particularly limited as long as a medium rest 35 is disposed within the drawable area 21*a*.

For example, the medium rest 35 may be provided in a region within the drawable area 21*a* and other than the part where the finger fixing unit 3 is provided, so as to widely surround the finger fixing unit 3.

Alternatively, the medium rest 35 may be provided only on either the right side portion or the left side portion of the finger fixing unit 3. Alternatively, a plurality of medium rests 35 having different sizes, depths, and the like may be prepared corresponding to sizes, types, and the like of various recording media P.

Here, the medium P includes sheet-like paper, card-like paper, a sheet, a card, or a film made of synthetic resin such as plastic.

The medium P is not limited to the ones exemplified herein, and any medium can be applied as long as the drawing head 41 of the ink jet system according to the present embodiment can draw on the medium.

On the medium rests 35 may be drawn a line indicating a position to place the medium P, marks indicating four corners of the medium P, and the like.

The medium rests 35 may be formed with a color having a large contrast to the surface color of the medium P to be placed. For example, if the surface color of the medium P is a light color such as white, the surface of the medium rests 35 is preferably formed with a dark color such as black.

As will be described later, in the present embodiment, it is determined from an image captured by the image capturing unit 50 whether or not the medium P is placed on the medium rests 35, and the type, size, and the like of the medium P placed on the medium rests 35. Therefore, in order to make it easy to grasp the presence, type, placed position, and the like of the medium P by image recognition, it is preferable to make the color contrast clear between the medium rests 35 and the medium P, to provide marks for easy identification, and the like, as described above.

As shown by the one-dot chain lines in FIG. 3B and FIG. 3C, the medium rests 35 are configured to have a height and a depth such that a height of the surface of the nail T placed in the finger fixing unit 3 and a height of the surface of the medium P placed on the medium rests 35 are substantially on a single plane.

As a result, even when drawing is performed on both the nail T and on the medium P, it is possible to maintain a constant distance (interval) between the targets and the drawing head 41, and to finish well on both the nail T and on the medium P without adjusting the position of the drawing head 41 in the height direction (ejection control of ink, and the like).

Considering that media P of various thickness may be used, a plurality of medium rests 35 having different heights may be prepared, such as medium rests 35 for thick media and medium rests 35 for thin media. In this case, the medium rests 35 on which the thick medium P is placed may have a concave shape corresponding to the shape of the medium P to be placed.

The drawing unit 40 includes the drawing head 41 which is a drawing unit main body, the unit holder 42 which holds the drawing head 41, an X-direction shifting stage 45 which shifts the drawing head 41 in the X direction (the X direction in FIG. 1 and the like, or the lateral direction of the nail printing apparatus 1), an X-direction shift motor 46, a Y-direction shifting stage 47 for shifting the drawing head 41 in the Y direction (the Y direction in FIG. 1 and the like, or the front-back direction of the nail printing apparatus 2), a Y-direction shift motor 48. In the present embodiment, a head shifter 49 (see FIG. 4) for shifting the drawing head 41 includes the X-direction shift motor 46 and the Y-direction shift motor 48.

The drawing head 41 of the present embodiment is an ink jet head for drawing by an ink jetting method.

The drawing head 41 is a head integrated with an ink cartridge in which, for example, ink cartridges (not shown) corresponding to yellow (Y) ink, magenta (M) ink, and cyan (C) ink and ink ejection units (not shown) respectively disposed on the surface of the ink cartridges (in the present embodiment, the lower surface in FIG. 1 and FIG. 2) facing the target (surface of the nail T) are formed integrally. The ink ejection units are respectively provided with a nozzle array composed of a plurality of nozzles for ejecting ink of each color. The drawing head 41 performs drawing by making fine ink droplets and directly blowing the ink from the ink ejecting units to the drawing target surface (nail T or medium P). The drawing head 41 is not limited to the one discharging the above three color inks. The drawing head 41 may include ink cartridges storing other ink and ink ejecting units.

The unit holder 42 is fixed to an X-direction shifter 451 attached to the X direction shifting stage 45. When the X-direction shift motor 46 is driven, the X-direction shifter 451 shifts on the X-direction shifting stage 45 in the X direction along a guide (not shown). As a result, the drawing head 41 attached to the unit holder 42 shifts in the X direction (the X direction in FIG. 2, or the left and right direction of the nail printing apparatus 1).

The X-direction shifting stage 45 is fixed to the Y-direction shifter 471 of the Y-direction shifting stage 47. When the Y-direction shift motor 48 is driven, the Y-direction shifter 471 shifts on the Y-direction shifting stage 47 in the Y direction along a guide (not shown). As a result, the drawing head 41 attached to the unit holder 42 shifts in the Y direction (the Y direction in FIG. 2, the front-back direction of the nail printing apparatus 1).

In the present embodiment, the X-direction shifting stage 45 and the Y-direction shifting stage 47 are configured by combining the X-direction shift motor 46 and the Y-direction shift motor 48 with a ball screw and a guide (not shown).

In the present embodiment, the X-direction shift motor 46, the Y-direction shift motor 48, and the like constitute the head shifter 49 as an X-Y driver which drives the drawing head 41 in the X direction and in the Y direction.

The drawing head 41, the X-direction shift motor 46, and the Y-direction shift motor 48 in the drawing unit 40 are connected to a drawing controller 816 (see FIG. 4) of a control device 80 described later, and are controlled by the drawing controller 816.

The image capturing unit 50 includes an image capturing device 51 and lighting devices 52.

The lighting devices 52 of the image capturing unit 50 illuminate the nail T of the target finger U1 inserted in the finger fixing unit 3 and exposed through the window 33. The image capturing device 51 captures an image of the target finger U1 and obtains a nail image of the nail T of the target finger U1 (a finger image including the nail image).

In the present embodiment, the image capturing unit 50 operates the image capturing device 51 and the lighting devices 52 to photograph the medium rests 35, to obtain image of the medium rests 35 and the medium P placed thereon.

In the present embodiment, the image capturing device 51 and the lighting devices 52 are disposed and fixed on the lower surface of the top surface 421 of the unit holder 42 of the drawing unit 40, on the side of the drawing head 41 (on the right side of the drawing head 41 in FIG. 2). As a result, the head shifter 49 can shift the image capturing device 51 and the like within the same range as the drawing head 41.

The positions of the image capturing device 51 and the lighting devices 52 are not limited to the illustrated examples.

The image capturing device 51 is, for example, a compact camera having a solid-state image sensor provided with approximately 2 million or more pixels and a lens.

The image capturing device 51 photographs the nail T to obtain a nail image (an image of the nail T including the target finger U1).

On the basis of the nail image, the nail-information detector 812 described later detects nail information such as the outline of the nail T (shape of the nail T), the curved shape of the nail T (the curvature of the nail T), and the vertical position of the nail T.

In the present embodiment, the image capturing device 51 also photographs the medium P to obtain a medium image (the medium P placed on the medium rests 35). On the basis of the medium image, the medium-information detector 813 described later detects medium information such as the outline of the medium P (shape of the medium P), and the vertical position of the medium P.

The lighting devices 52 are, for example, illumination lamps such as white LEDs.

In the present embodiment, two lighting devices 52 are arranged at the front side and the back side of the image capturing device 51 and sandwich the image capturing device 51. The imaging devices 52 emit light downward to illuminate the area below the image capturing device 51 to be photographed. The number of the illumination devices 52 to be provided, their arrangement, and the like are not limited by the illustrated examples.

The image capturing unit 50 is connected to an imaging controller 811 (see FIG. 4) of a control device 80 described later, and is controlled by the imaging controller 811.

The image data of the nail image photographed by the image capturing unit 50 is stored in the nail-image storage area 821 of the storage 82 described later. The obtained image data of the medium image of the medium P may also be stored in the storage 82.

The control device 80 is placed, for example, on a substrate (not shown) disposed on the lower surface side of the top surface of the housing 11.

Figure 4:
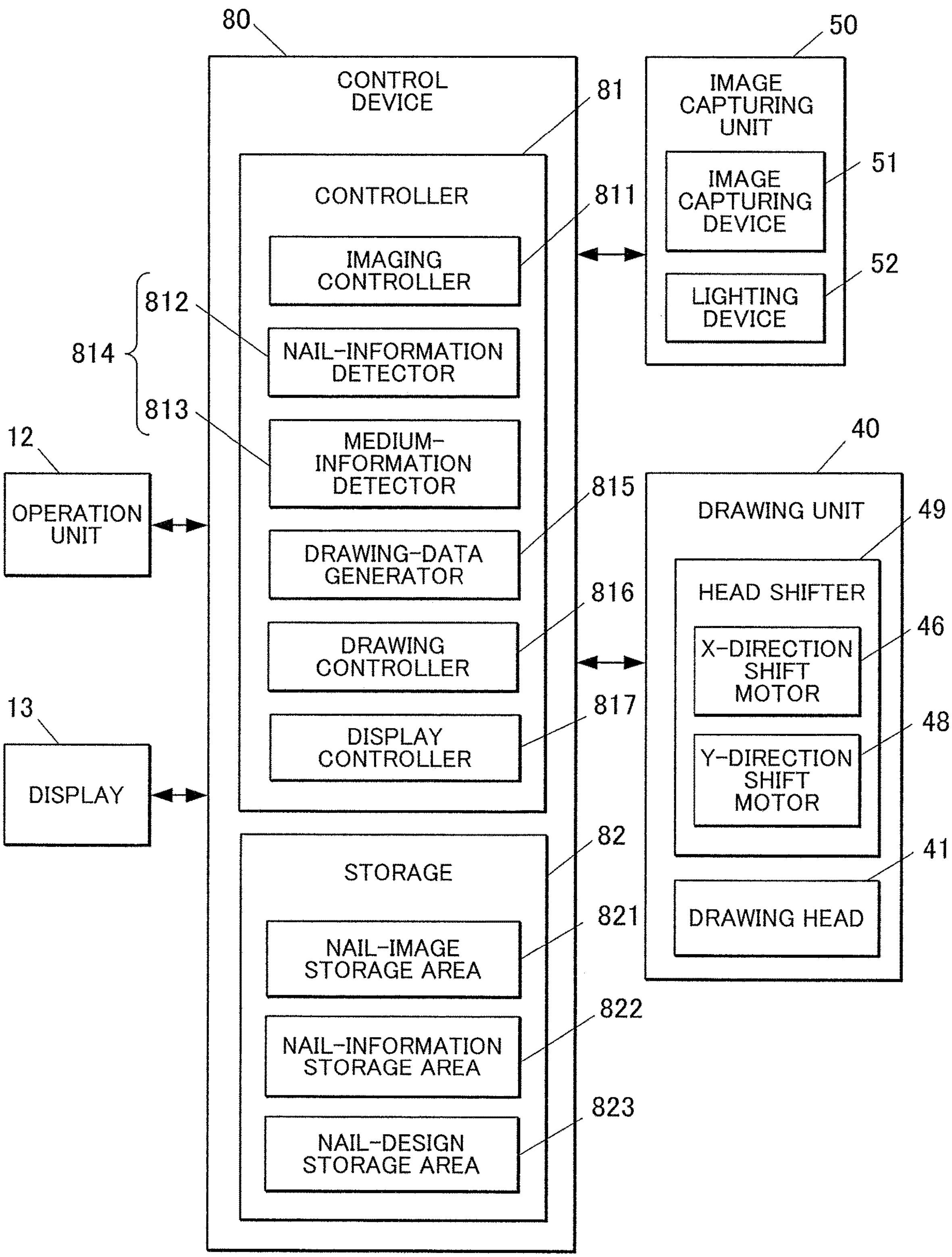
FIG. 4 is a block diagram of essential components showing control configuration of a nail printing apparatus according to the first embodiment.
Figure 5:
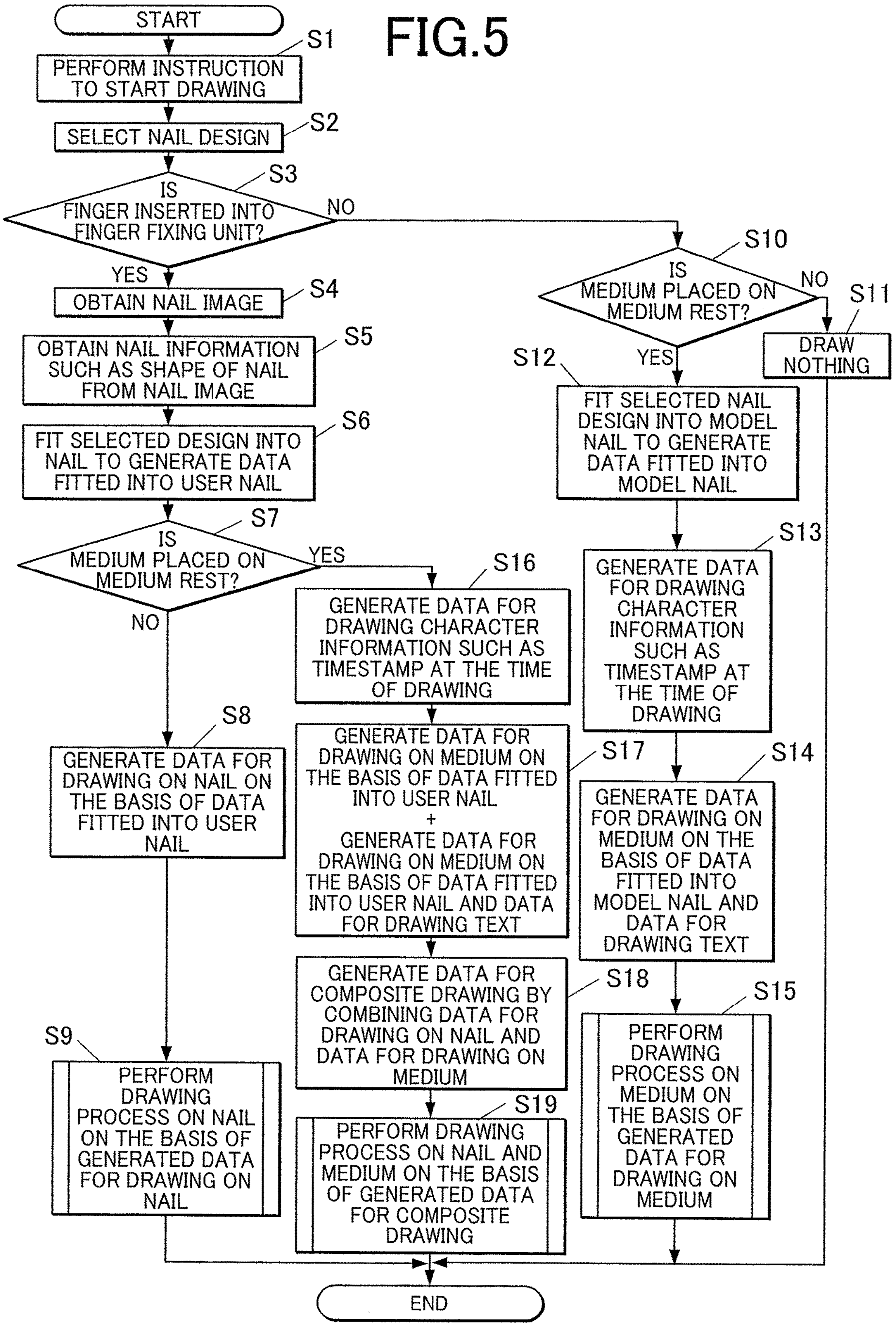
FIG. 5 is a flow chart illustrating a drawing process by the nail printing apparatus according to the first embodiment.

FIG. 4 is a block diagram of essential components of the control configuration according to the present embodiment.

As shown in FIG. 4, the control device 80 is a computer including a controller 81 including CPU (Central Processing Unit) (not shown) and a storage 82 including a read only memory (ROM) and a random access memory (RAM) (both not shown).

The storage 82 stores various programs and various data for operating the nail printing apparatus 1.

In detail, the ROM of the storage 82 stores programs including: a nail-information detecting program for detecting nail information such as the shape of the nail T, the outline of the nail T, the width of the nail, the size of the nail, and the like from the nail image; a medium-information detecting program for detecting presence or absence of the medium P, and the type of the medium P from the medium image; a drawing-data generating program for generating data for drawing; and a drawing program for executing the drawing process. These programs are executed by the control device 80 to comprehensively control the components of the nail printer 1.

The storage 82 according to the present embodiment includes a nail-image storage area 821 storing nail images of the nail T of the target finger U1 of a user photographed by the image capturing unit 50, a nail-information storage area 822 storing the nail information (which includes the outline of the nail T and the tilt angle of the nail T) detected by the nail-information detector 812, and a nail-design storage area 823 storing image data of nail designs to be drawn on the nail T.

The controller 81 functions as the imaging controller 811, the nail-information detector 812, the medium-information detector 813, a drawing-data generator 815, the drawing controller 816, a display controller 817, and the like. These functions are achieved by the CPU of the controller 81 in cooperation of the programs stored in the ROM of the storage 82.

The imaging controller 811 controls the image capturing device 51 and the lighting devices 52 of the image capturing unit 50 to cause the image capturing device 51 to photograph a finger image (hereinafter, a "nail image") including an image of the nail T of the target finger U1 fixed to the finger fixing unit 3.

The image data of the nail image captured by the image capturing unit 50 is stored in the nail-image storage area 821 of the storage 82.

The nail-information detector 812 detects nail information on the nail T of the target finger U1 on the basis of the image of the nail T of the target finger U1 fixed to the finger fixing unit 3 captured by the image capturing device 51.

Here, the nail information includes, for example, the outline of the nail T (shape of the nail, XY coordinates of the nail T on the horizontal plane, and the like), the height of the nail T (the position of the nail T in the vertical direction, and hereinafter simply referred to as a "vertical position of the nail T" or "position of the nail T"), the angle between the surface of the nail T and the XY plane (tilt angle of the nail T, the curvature of the nail), and the like.

Furthermore, the nail information includes whether or not the target finger U1 (the nail T of the target finger U1) is fixed to the finger fixing unit 3, that is, the presence or absence of the nail T.

The medium-information detector 813 detects the medium information on the medium P based on the image of the medium P placed on the medium rests 35 photographed by the image capturing device 51.

Here, the medium information includes: whether or not the medium P is placed on the medium rests 35, that is, the presence or absence of the medium P; the position where the medium P is placed; the direction of the placed medium P; the type of the medium P (shape, size, thickness, etc.); and the like.

As described above, in the present embodiment, the medium rests 35 are formed with a color having a large contrast to the surface color of the medium P, or is provided with marks and the like for identifying the medium P.

Therefore, for example, if there is a portion clearly different in color from the medium rests 35 (background), the outline and the shape of the portion can be extracted from the image so that the region where the medium P is placed can be specified.

Alternatively, for example, a mark showing the outline of the medium P may be provided in the medium rests 35. In such case, the medium P is determined to be placed on and covering the mark, if a part of the mark cannot be detected from the image. As a result, the presence or absence and the outline shape of the medium P can be also detected.

Alternatively, a mark and the like may be attached not on the medium rests 35 but on the medium P for identifying the type and the like of the medium P. In such case, it is possible to obtain information on the type of the medium P, such as the shape, size, thickness, etc., of the medium P, by detecting the mark from the medium image captured by the image capturing unit 50. Furthermore, the medium-information detector 813 may obtain medium information including paper quality (for example, whether it is plain paper or special paper for ink jetting, etc.) of the medium P, and color of the paper.

The medium information detected by the medium-information detector 813 may be stored in the storage 82 or the like.

In the present embodiment, as shown in FIG. 4, a target detector 814 includes the nail-information detector 812 and the medium-information detector 813, and detects the presence or absence of the target (that is, the nail T and the medium P) arranged in the drawable area 21*a* and the type of the target (that is, the nail T and the medium P).

The drawing-data generator 815 generates data for drawing, according to the target (that is, the nail T and the medium P) detected by the target detector 814.

First, when the nail information is detected by the nail-information detector 812 (the target detector 814), the drawing-data generator 815 generates data for drawing on nail to perform the drawing process on the nail T of the target finger U1 by the drawing head 41 on the basis of the detected nail information.

Specifically, the drawing-data generator 815 performs a fitting process to adjust the image of the nail design to the shape of the nail T by enlarging, reducing, cutting out, and the like of the nail design based on the shape and the like of the nail T of the user detected by the nail-information detector 812.

In addition, the drawing-data generator 815 appropriately corrects the image data of the nail design on the basis of three-dimensional shape of the nail T, such as distortion correction, according to the nail information detected by the nail-information detector 812.

As a result, data for drawing on nail by the drawing head 41 is generated, which includes a nail design to be drawn on the nail T.

When the medium information is detected by the medium-information detector 813 (the target detector 814), the drawing-data generator 815 generates data for drawing on medium on the basis of the detected medium information so as to draw on the medium P by the drawing head 41.

Specifically, if the target includes both the nail T and the medium P, the drawing-data generator 815 performs a fitting process to adjust the image of the nail design to the shape of the nail T by enlarging, reducing, cutting out, and the like of the nail design based on the shape and the like of the nail T of the user detected by the nail-information detector 812. What is different from the case of drawing on the nail T having a curved surface is that, in generating the data for drawing on medium to draw on the medium P, the correction (for example, the distortion correction) process peculiar to the case of drawing on the nail T and the like is not performed.

Furthermore, when the medium P is also the target, data for drawing text such as a timestamp at the time of the drawing operation, character information input by the user, and the like is generated so as to be arranged at a predetermined position in the recoding medium P, at a position where the image of nail T is not drawn (so as not to overlap with the image of the nail T).

As a result, data for drawing on medium by the drawing head 41 is generated to draw the nail design on the medium P.

Otherwise, if the target includes only the medium P as a result of detection by the target detector 814 (that is, the nail-information detector 812 and the medium-information detector 813), the drawing-data generator 815 performs a fitting process to adjust the image of the nail design to the shape of a model nail by enlarging, reducing, and cutting out the nail design based on the shape or the like of the nail stored in the storage 82 and the like. What is also different from the case of drawing on the nail having a curved surface is that, in generating the data for drawing on medium for drawing on the medium P, the correction (for example, the distortion correction) process peculiar to the case of drawing on the nail and the like is not performed.

Furthermore, when drawing on the medium P, the data for drawing text such as timestamp at the time of the drawing operation, character information input by the user, and the like is generated so as to be arranged at a predetermined position in the recoding medium P, at a position where the image of nail is not drawn (so as not to overlap with the image of the nail).

As a result, data for drawing on medium by the drawing head 41 is generated to draw the nail design on the medium P.

When the medium information detected by the medium-information detector 813 includes information such as paper quality, and color of the medium P, the drawing-data generator 815 may adjust density, color tone, and the like according to the paper quality and the color of the medium P in generating data for drawing on medium.

The drawing controller 816 is a controller which outputs a control signal to the drawing unit 40 on the basis of the data for drawing generated by the drawing-data generator 815, and controls the X-direction shift motor 46, the Y-direction shift motor 48, the drawing head 41, and the like of the drawing unit 40 so that drawing can be performed on the nail T in accordance with the data for drawing.

In the present embodiment, the drawing-data generator 815 may generate the data for drawing on nail to draw on the nail T and the data for drawing on medium to draw on the medium P. The drawing controller 816 controls the drawing unit 40 on the basis of each data for drawing.

Since the finger fixing unit 3 on which the nail T is arranged and the medium rests 35 on which the medium P is placed are both located within the drawable area 21*a* of the drawing head 41, it is possible to appropriately perform the drawing operation on both targets.

If the drawing operation on the nail T and the drawing operation on the medium P are both performed, the two drawing operations may be performed in parallel (that is, for example, the drawing operations are performed while the drawing head 41 reciprocates between the finger fixing unit 3 and the medium rests 35). Alternatively, after completion of the drawing operation on either one of the nail T and the medium P, the drawing operation on the other target may be performed.

Different drawing control methods may be specifically used for drawing on the nail T and for drawing on the medium P. Because the surface of the medium P is not curved unlike the nail T, the finish of the drawing on the medium P may be improved without a drawing control which is specially performed corresponding to the curved surface of the nail T.

The display controller 817 controls the display 13 to display various display screens on the display 13. In the present embodiment, the display control unit 817 causes the display 13 to display, for example, a nail design selection screen, a thumbnail image to confirm the design, a nail image obtained by photographing the target finger U1, various instruction screens and operation screens, and the like.

Next, with reference to FIG. 5 and FIG. 6A to FIG. 6C, the operation of the nail printing apparatus 1 in the present embodiment will be described.

For drawing on the nail T with the nail printing apparatus 1 according to the present embodiment, when the user inputs an instruction to start drawing through the operation unit 12 and the like to instruct the apparatus to start drawing (step S1), the controller 81 causes the display unit 13 or the like to display a nail design selection screen so that the user can select a nail design to be drawn. A nail design to be drawn is selected by selection and inputting of a desired nail design by the user (step S2).

The controller 81 determines whether or not the target finger U1 is inserted into the finger fixing unit 3 (step S3). Specifically, the controller 81 causes the image capturing unit 50 to capture an image of the interior of the finger fixing unit 3, and analyzes the image to determine whether or not there are the target finger U1 and its nail T in the finger fixing unit 3.

If the target finger U1 is inserted into the finger fixing unit 3 (step S3; YES), the controller 81 controls the image capturing unit 50 to capture an nail image for detecting nail information and obtains the image (step S4).

When the nail image is obtained, the nail-information detector 812 obtains nail information, such as the shape of the nail, from the nail image (step S5). Then, the drawing-data generator 815 fits the selected nail design into the nail T of the user and generates data fitted into user nail (step S6).

The controller 81 determines whether or not the medium P is placed on the medium rests 35 (step S7). When the medium P is not placed on the medium rests 35 (step S7; NO), the controller 81 generates data for drawing on nail based on the data fitted into user nail generated in step S6 (step S8) and performs the drawing process on the nail T based on the generated data for drawing on nail (step S9).

Figure 6A:
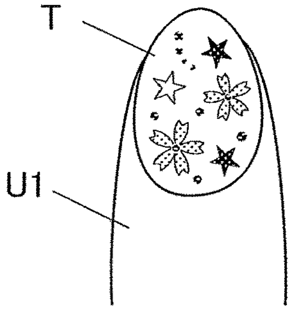
FIG. 6A is a plan view showing an example of a nail after drawing in a case where only the nail is set in the drawable area.

FIG. 6A shows an example of drawing in the case where only the nail T is set and the drawing process is performed only on the nail T. In this case, the nail design Pd is drawn on the nail T of the user.

On the other hand, when the target finger U1 is not inserted into the finger fixing unit 3 in step S3 (step S3; NO), the controller 81 determines whether or not the medium P is placed on the medium rests 35 (Step S10). When the medium P is not placed on the medium rests 35 (step S10; NO), the process is ended without drawing anything (step S11). In this case, attention may be given to the user by causing the display 13 to display a message and the like prompting to set the target finger U1 or the medium P at a predetermined position.

On the other hand, when the medium P is placed on the medium rests 35 (step S10; YES), the selected nail design is fitted into the model nail Tm to generate data fitted into model nail (step S12).

Then, the data for drawing text, which is data for drawing character information such as a timestamp at the time of the drawing operation, is generated (step S13).

Furthermore, the data for drawing on medium is generated based on the data fitted into model nail and the data for drawing text (step S14), and the drawing process is performed on the medium P on the basis of the generated data for drawing on medium (Step S15).

Figure 6B:
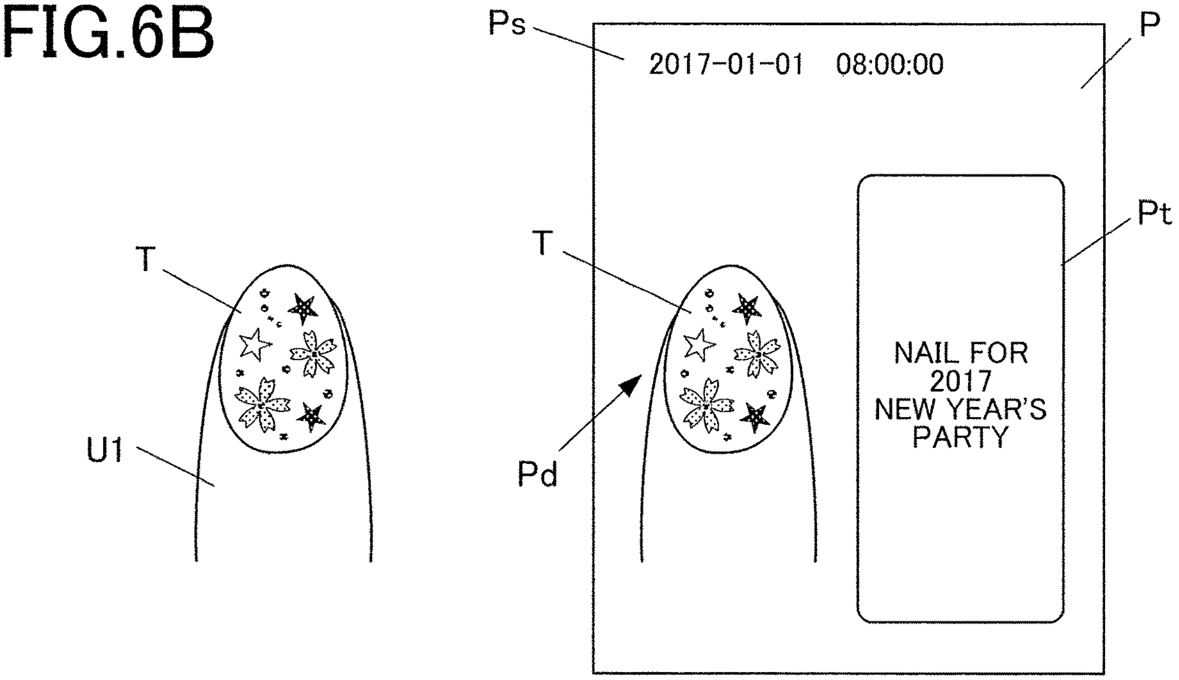
FIG. 6B is a plan view showing an example of a nail and a medium for recording after drawing in a case where the nail and the medium for recording are set in the drawable area.
Figure 6C:
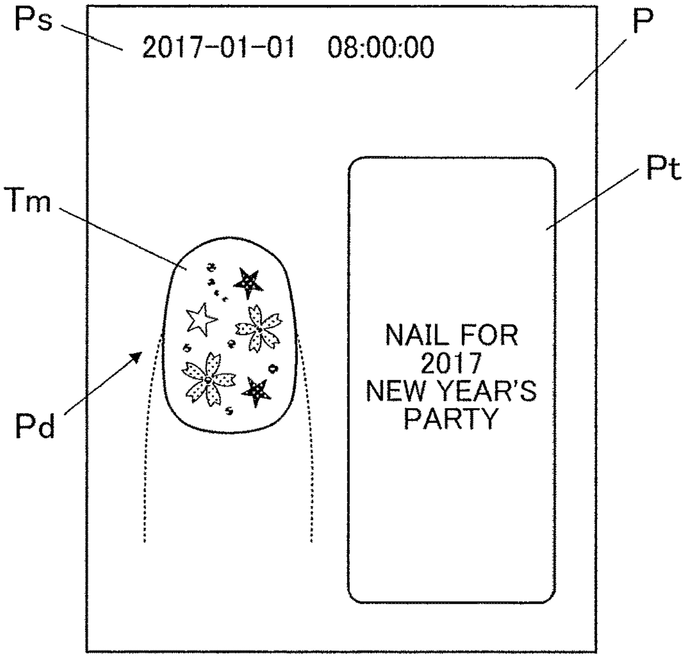
FIG. 6C is a plan view showing an example of a medium for recording after drawing in a case where only the medium for recording is set in the drawable area.

FIG. 6C shows an example of drawing in the case where only the medium P is set and the drawing process is performed only on the medium P. In this case, the nail design is drawn on the medium P set on the medium rests 35.

For example, as shown in FIG. 6C, the content drawn on the medium P includes an image of the nail design Pd fitted into the model nail Tm, a timestamp Ps indicating the date and time of the drawing operation, text information Pt such as comments input by the user through the operation unit 12, and the like. The text information is not limited to the one input by the user, but may be data associated with the nail design data such as a type number, and comments (for example, “Spring design No. 1”, etc.).

If the medium P is placed on the medium rests 35 in step S7 (step S7; YES), the drawing-data generator 815 generates the data for drawing text which is data for drawing character information such as a timestamp at the time of the drawing operation (step S16).

In addition to the data for drawing on nail based on the data fitted into user nail generated in step S6, the controller 81 generates the data for drawing on medium based on the data fitted into user nail and the data for drawing text (step S17). The data for drawing on medium is based on the data fitted into nail of the user, but is not subjected to the nail-specific correction process such as distortion correction.

Furthermore, the data for drawing on nail and the data for drawing on medium are combined to generate data for composite drawing (step S18). On the basis of the generated data for composite drawing, the drawing process is performed on the nail T and the medium P (step S19).

FIG. 6B shows an example of drawing in the case where the nail T is set in the finger fixing unit 3, the medium P is set on the medium rests 35, and the drawing process is performed both on the nail T and the medium P. In this case, the nail design is drawn on the nail T set in the finger fixing unit 3 and on the medium P set on the medium rests 35.

In this case, the drawing performed on the nail T of the user is similar to that in the case shown in FIG. 6A, in which only the nail T is the target. The content drawn on the medium P includes the image in which the nail design Pd is fitted into the nail T of the user as well as the timestamp Ps indicating the date and time of the drawing operation and the text information Pt such as comments input by the user through the operation unit 12 and the like, as in the case shown in FIG. 6C in which only the medium P is the target.

In the example of FIG. 6A to FIG. 6C, the image of the nail with the nail design includes not only an image of a nail but also an image of a finger portion, however, the image to be drawn with respect to the nail is not limited thereto, but may be an image of only the nail without including the finger portion.

The contents to be drawn on the medium P, their layout, and the like are not limited to the examples illustrated in FIG. 6B and FIG. 6C. The contents to be drawn, their layout, and the like can be freely set by the user.

In this way, even if the user does not perform any setting and the like, an appropriate image can be drawn on the set target.

As described above, according to the present embodiment, the target detector 814 (that is, the nail-information detector 812 and the medium-information detector 813) detects whether or not the target is arranged in the drawable area 21*a*, if the target is arranged, the type of the target arranged in the drawable area 21*a*, and the like. Then, according to the detection results, data for drawing is generated and drawing is performed based on the data for drawing.

Therefore, even if the user does not set the target in advance, it is possible to automatically perform an appropriate drawing process according to the target to be drawn by simply setting the target to be drawn on the apparatus.

In particular, in the present embodiment where the assumed target includes the nail T of the target finger U1 and the medium P such as paper, the target detector 814 detects the outlines of the nail T and the medium P to automatically obtain the presence or absence of the nail T and the medium P, the placement position thereof, the area range to be drawn, and the like. Thus, without taking much effort, any special setting, and the like, it is possible to easily perform a nail printing on the nail T and a drawing process on paper and the like to keep the design drawn on the nail T. Furthermore, because drawing on paper and the like is possible when nail printing is performed on the nail T, it is not necessary to perform a setting process, a drawing process, and the like again later.

Furthermore, in the present embodiment, the height of the surface of the nail T determined when the nail T of the target finger U1 is fixed in the finger fixing unit 3 and the height of the surface of the medium P placed on the medium rests 35 are almost on a single plane.

Therefore, it is not necessary to adjust the position of the drawing head 41 in the height direction of the drawing unit 40 depending on whether the drawing process is performed on the claw T or on the medium P. The drawing process can be performed from an appropriate height position for drawing on either target.

In the present embodiment, the data for drawing on medium to draw on the medium P includes image data to be drawn on the nail T (namely, data of a nail design drawn on the nail T) and arbitrary character data.

Therefore, comments and memos with respect to the design applied to the nail T can be recorded on the medium P, to leave a meaningful collection for reference later.

Second Embodiment

Next, the second embodiment of a drawing apparatus, a drawing method, and a recording medium storing a program according to the present invention will now be described with reference to FIG. 7 to FIG. 14. In the second embodiment, the target and the like on which the drawing apparatus draws is different from that in the first embodiment. Hereinafter, configurations which are different from those of the first embodiment will be described.

Figure 7:
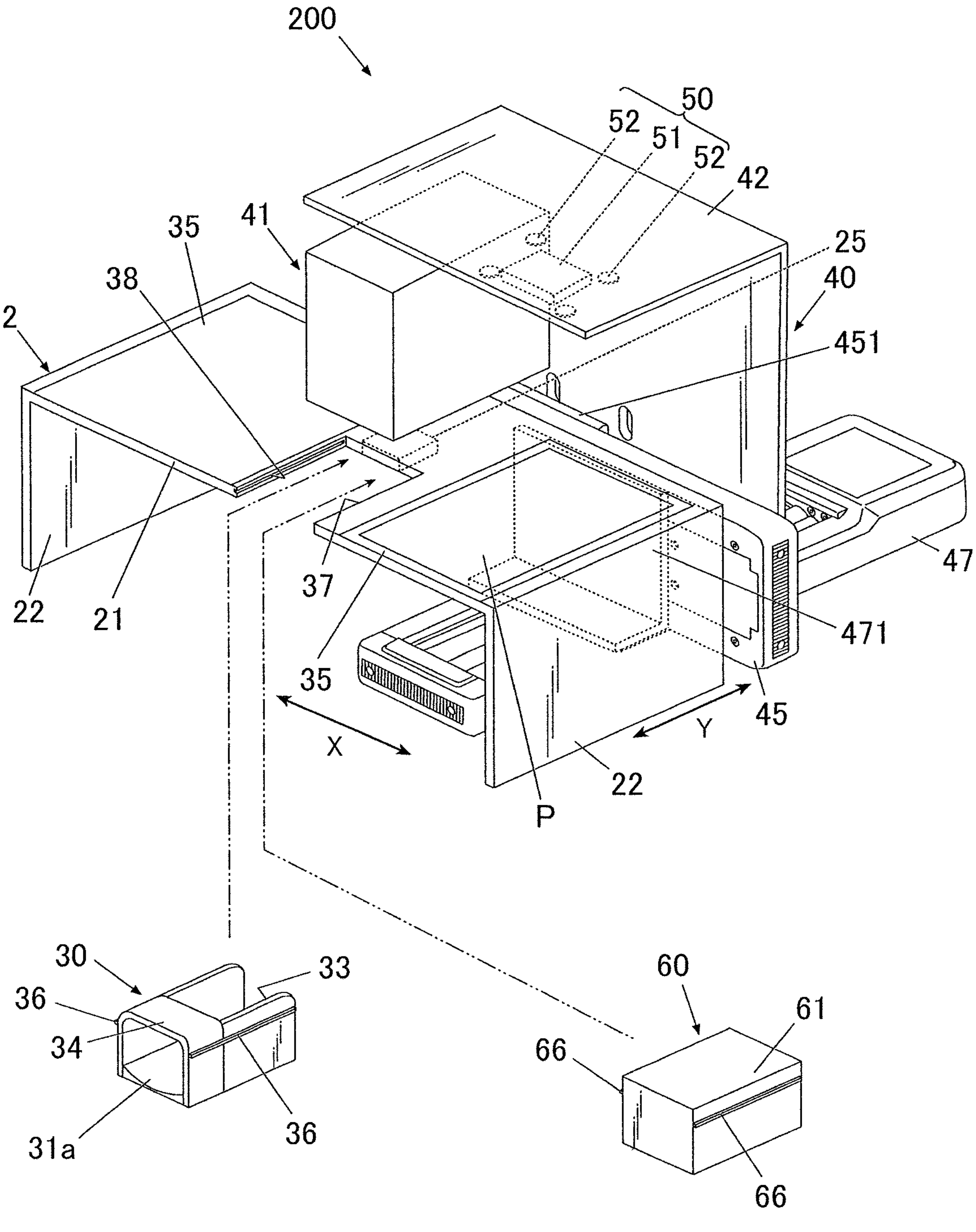
FIG. 7 is a perspective view showing an overall configuration of a drawing apparatus in the second embodiment.

FIG. 7 is a perspective view of essential parts of the drawing apparatus according to the present embodiment. In FIG. 7, the housing is not described so that the internal configuration can be easily seen.

As shown in FIG. 7, the drawing apparatus 200 is provided with a target holder 2 as in the first embodiment.

In the drawable area 21*a* of the upper surface plate 21 of the target holder 2 according to the present embodiment, there are provided medium rests 35 similar to those of the first embodiment. As in the first embodiment, the medium P is placed on the medium rests 35 as a medium for memorandum to keep the nail design printed on the nail T, the date of printing the nail design, comments, and the like.

Figure 8A:
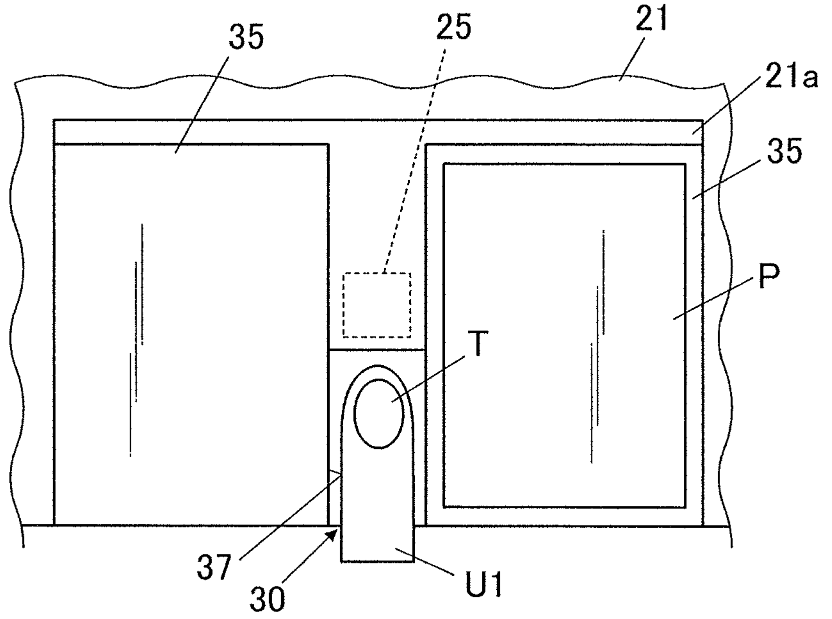
FIG. 8A is a schematic plan view in the case where a finger holder is mounted in a holder space.
Figure 9A:
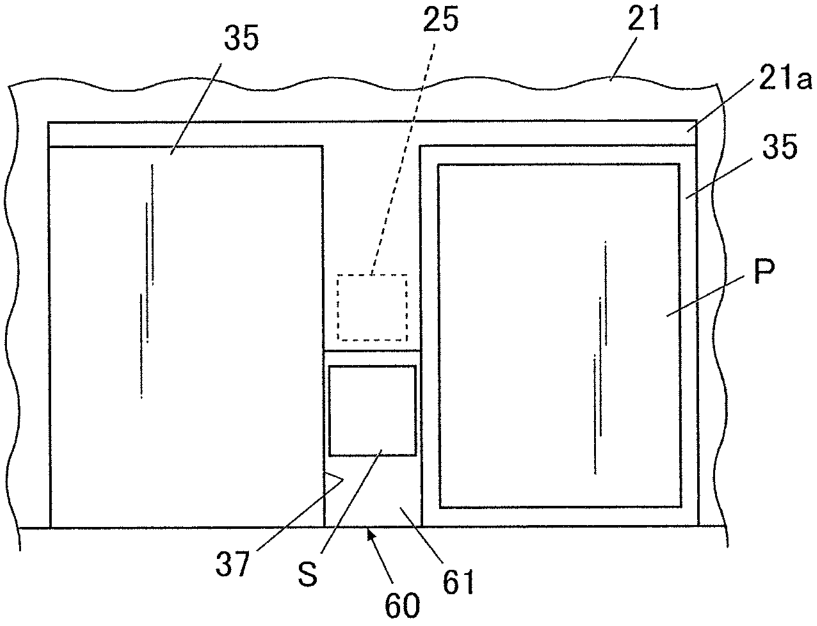
FIG. 9A is a schematic plan view in the case where the medium holder is mounted in the holder space.

In the present embodiment, a holder space 37 is formed on the upper surface plate 21 almost at the center in the width direction (X direction in FIG. 7, FIG. 8A, and FIG. 9A).

The holder space 37 is a substantially U-shaped cutout portion opening toward the front of the apparatus.

Guide rails 38 extending in the front-rear direction (Y direction in FIG. 7) of the apparatus are provided on both sides within the holder space 37.

The finger holder 30 for holding the target finger U1 and the medium holder 60 for holding medium for recording S (hereinafter, referred to as a "medium S") can be selectively and removably mounted in the holder space 37. That is, as shown in FIG. 7, the finger holder 30 or the medium holder 60 can be mounted in the holder space 37.

As shown in FIG. 7 and the like, the finger holder 30 is a substantially box-shaped member opening toward the front of the apparatus. The inner bottom surface of the finger holder 30 is a finger rest 31*a* on which the target finger U1 is placed. The finger rest 31*a* is made of a resin or the like having flexibility, for example, and pushes up and holds the target finger U1 from the bottom. The configuration of the finger rest 31*a* is not particularly limited, as long as it can hold the target finger U1 from the bottom. For example, it may be urged from the bottom by an elastic member such as a spring.

Similar to the finger fixing unit 3 according to the first embodiment, there is a window 33 opening upward at the back of the top of the finger holder 30. The nail T of the target finger U1 inserted into the finger fixing unit 3 is exposed from the window 33.

The portion at the front of the top of the finger holder 30 is a finger presser 34 for regulating the position of the target finger U1 in the vertical direction. The positions of the target finger U1 and its nail T are determined to be predetermined positions by being held by the finger rest 31*a* from the bottom and by being pressed by the finger presser 34 at the top of the target finger U1.

Guides 36 are provided on both sides of the finger holder 30, i.e., at positions corresponding to the guide rails 38 of the holder space 37 when the finger holder 30 is mounted in the holder space 37. The guides 36 extend in the front-rear direction (Y direction in FIG. 7) of the apparatus.

The guides 36 are engaged with the guide rails 38 when the finger holder 30 is mounted in and removed from the holder space 37 and guide the shift along the Y direction (see FIG. 7).

The medium holder 60 is a substantially box-shaped member. The top of the medium holder 60 is a medium holding unit 61 on which the medium S is placed and held.

Guides 66 are provided on both sides of the medium holder 60, i.e., at positions corresponding to the guide rails 38 of the holder space 37 when the medium holder 60 is mounted in the holder space 37. As well as the finger holder 30, the guides 66 extend in the front-rear direction (Y direction in FIG. 7) of the apparatus.

The guides 66 are engaged with the guide rails 38 when the medium holder 60 is mounted in and removed from the holder space 37 and guides the shift along the Y direction (see FIG. 7).

Furthermore, in the present embodiment, a member identification portion (not shown) such as a barcode is provided on the outer surface of the back of the finger holder 30 and the medium holder 60 (that is, the back side in the Y direction in FIG. 7).

A holder detector 25 (see FIG. 7, FIG. 10, etc.) capable of reading the member identification portion is provided on the back of the upper surface plate 21 or the like, i.e., at a position corresponding to the member identification portion when the finger holder 30 or the medium holder 60 is mounted in the holder space 37.

In the present embodiment, the holder detector 25 reads the member identification portion to detect which is mounted in the holder space 37, the finger holder 30 which holds the nail T of the target finger U1 or the medium holder 60 which holds the medium S such as a nail seal or a transfer sheet (for example, a tattoo sheet).

The finger holder 30 and the medium holder 60 are not limited to one kind each.

For example, as the finger holder 30, multiple finger holders 30 may be prepared according to the thickness of the finger, such as large, medium, and small, so that an optimal one can be appropriately selected and used among them.

Furthermore, for example, as the medium holder 60, multiple kinds of medium holders 60 having different heights of the medium holder 61 may be prepared according to the thickness and the like of the medium S (Sn or St). Among them, an optimal one can be appropriately selected and used.

In this case, different member identification portions may be attached to the finger holders 30 and the medium holders 60 respectively, so that the holder detector 25 reads the member identification portion to detect which of the finger holders 30 and the medium holders 60 is mounted in the holder space 37.

Figure 8B:
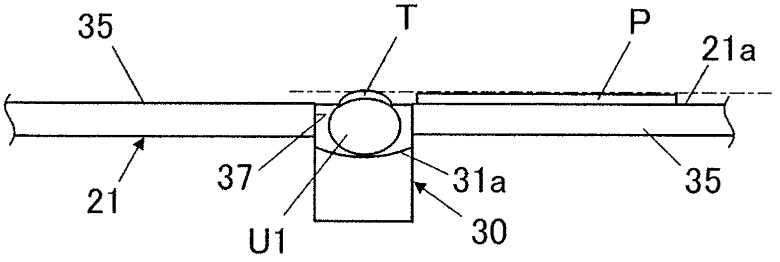
FIG. 8B is a schematic front view in the case where the finger holder is mounted in the holder space.
Figure 8C:
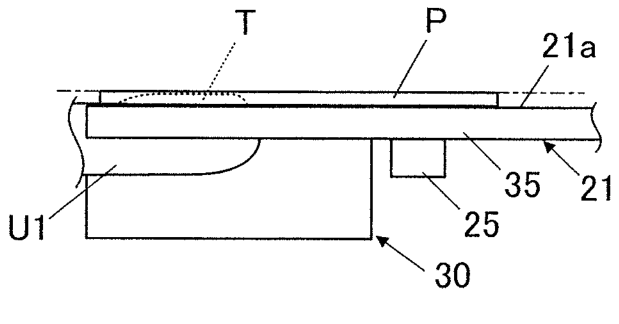
FIG. 8C is a schematic side view in the case where the finger holder is mounted in the holder space.
Figure 9B:
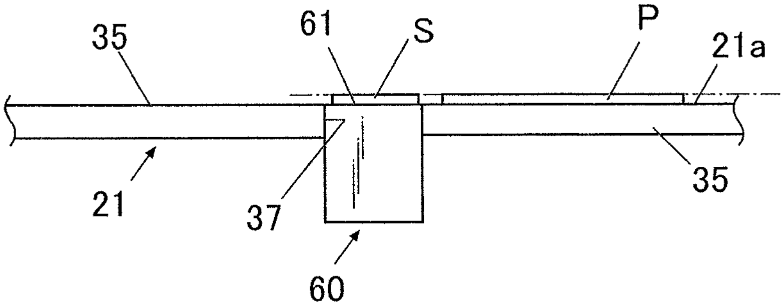
FIG. 9B is a schematic front view in the case where the medium holder is mounted in the holder space.
Figure 9C:
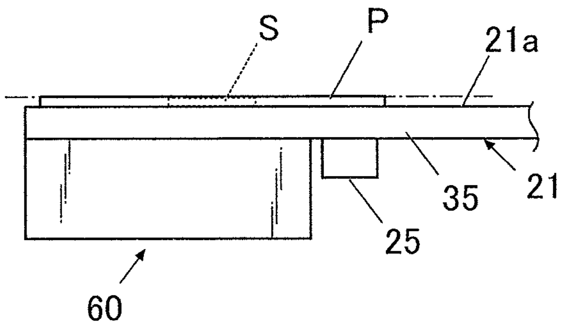
FIG. 9C is a schematic side view in the case where the medium holder is mounted in the holder space.

FIG. 8A to FIG. 8C and FIG. 9A to FIG. 9C are schematic diagrams of the drawable area. FIG. 8A is a schematic plan view, FIG. 8B is a schematic front view, and FIG. 8C is a schematic side view in the case where the finger holder 30 is mounted in the holder space 37. FIG. 9A is a schematic plan view, FIG. 9B is a schematic front view, and FIG. 9C is a schematic side view in the case where the medium holder 60 is mounted in the holder space 37.

As shown in FIG. 8A to FIG. 8C and FIG. 9A to FIG. 9C, in the present embodiment, as in the first embodiment, the height of the surface of the nail T determined when the nail T of the target finger U1 is held by the finger holder 30, the height of the surface of the medium S determined when the medium S such as nail seals and transfer sheets (e.g. tattoo sheets) is held by the medium holder 60, and the height of the surface of the medium P (such as a medium for memorandum) placed on the medium rests 35 are almost on a single plane.

Therefore, it is not necessary to adjust the position of the drawing head 41 of the drawing unit 40 in the height direction, regardless of whether the target to be drawn is the nail T, the medium S (Sn or St), or the medium P. The drawing process can be performed from an appropriate height position for drawing on either target.

Figure 10:
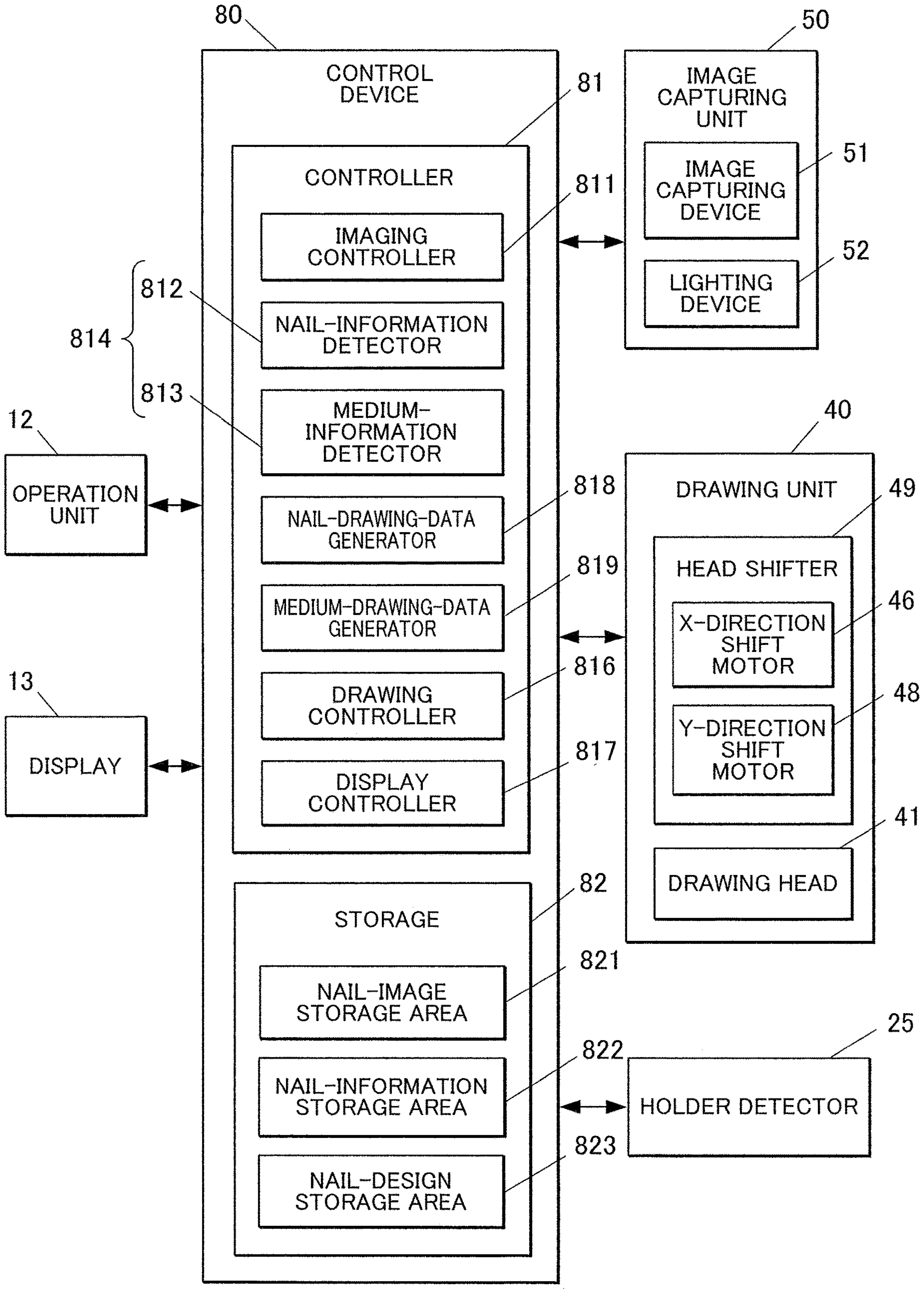
FIG. 10 is a block diagram of essential components of the control configuration according to the second embodiment.

FIG. 10 is a block diagram of essential components of the control configuration according to the present embodiment.

As shown in FIG. 10, the drawing apparatus 200 is provided with the holder detector 25.

As described above, the holder detector 25 reads the member identification portion of the finger holder 30 or the medium holder 60 mounted in the holder space 37, for example, a barcode reader reading a barcode. The member identification portion is not limited to the one composed of a barcode, but may be constituted by other identification marks. If the member identification portion is constituted by identification marks other than a barcode, the holder detector 25 is also composed of various readers, sensors, and the like which can read the member identification portion.

Since the holder detector 25 can automatically detect the type of the holder (namely, the finger holder 30 or the medium holder 60) mounted in the holder space 37, the drawing target can be correctly set without input by the user each time.

Furthermore, in the present embodiment, as in the first embodiment, the controller 81 including a processor (CPU) or the like is provided.

For example, the controller 81 is provided with, as in the first embodiment, the target detector 814 including the nail-information detector 812 and the medium-information detector 813.

In the present embodiment, the medium-information detector 813 detects whether or not the medium P is placed on the medium rests 35, and in the case where the medium P is placed, the medium-information detector 813 detects the arranged position and the range (size).

The medium-information detector 813 may detect the arranged position, the range (size), and the like of the medium P by any method which is not particularly limited. For example, the detection may be performed on the basis of the information input and set by the user through the operation unit 12 and the like. If the image capturing device 51 of the image capturing unit 50 can photograph the medium rests 35, information regarding the medium P placed on the medium rests 35 may be obtained by analyzing the photographed image. Furthermore, the information regarding the medium P detected by the medium information detection unit 813 is not limited to information on the arranged position and range thereof. For example, it is also possible to detect paper quality (for example, whether it is plain paper, paper for ink jetting) and the like which affects drawing conditions on the medium P. In this case, it is also possible to draw under a drawing condition suitable for the medium P. If various conditions such as size and paper quality of the medium P are standardized, a product number and the like may be described on the surface and the like of the medium P to be read by the medium-information detector 813, so that various information associated with the product number and the like can be obtained on the medium P.

Furthermore, in the present embodiment, when the medium holder 60 mounted in the holder space 37, the medium-information detector 813 detects the type, arranged position, range (size), shape, and the like regarding the medium S held by the medium holder 60.

Even in this case, the medium-information detector 813 may perform detection of the type, the arrangement position, the range (size), shape, and the like regarding the medium S by any method which is not particularly limited. For example, the detection may be performed on the basis of the information input and set by the user through the operation unit 12 and the like.

The type of the medium S is, for example, a medium Sn such as a nail seal on which a normal image of the nail design is drawn, or a transfer sheet (for example, a tattoo sheet) on which a reversed image of the nail design is drawn.

The medium-information detector 813 may obtain information on the medium S held by the medium holder 60 by analyzing the image of the medium S held by the medium holder 60 photographed by the image capturing device 51 of the image capturing unit 50. If various conditions such as the size and the paper quality of the medium S are standardized, a product number and the like may be described on the surface and the like of the medium S to be read by the medium-information detector 813, so that various information associated with the product number and the like can be obtained regarding the medium S. For example, if various conditions such as the type and size are standardized, a product number and the like may be described on the surface and the like of the medium S to be read by the medium-information detector 813, so that various information associated with the product number and the like can be obtained on the medium S.

In the present embodiment, the type of the medium S (that is, the medium Sn such as a nail seal or a medium St such as a tattoo sheet) is input and set by the user in advance through the operation unit 12 and the like. The medium-information detector 813 then detects the type of the medium S on the basis of the input information.

As in the case where the drawing-data generator 815 in the first embodiment performs regarding the nail T, The nail-drawing-data generator 818 generates data for drawing on nail on the basis of the nail information detected by the nail-information detector 812 so that the drawing head 41 performs drawing on the nail T of the target finger U1. Since the specific methods for generating the data for drawing on nail are the same as those in the first embodiment, the description thereof will be omitted.

As a result, the data for drawing on nail is generated regarding the nail design drawn on the nail T by the drawing head 41.

If the target is not the nail T, the medium-drawing-data generator 819 generates data for drawing corresponding to the target (that is, the medium Sn or St or the medium P).

Specifically, the medium-drawing-data generator 819 enlarges, reduces, cuts out, or the like of the nail design based on the position or shape of the target to be drawn, and generates data for drawing on medium according to paper quality and the like. If the target is not the nail T having a three-dimensional shape, distortion correction and the like is not performed. In the case where the medium S held by the medium holder 60 is not a planar nail seal but a nail chip or the like having the same curved surface shape as the nail T or the like, distortion correction similar to the one performed when the nail T is the target may be performed to generate data for drawing on medium similar to the data for drawing on nail.

The medium-drawing-data generator 819 according to the present embodiment generates data for drawing according to the type of the medium S detected by the target detector 814, for example, if the target is a medium Sn such as a nail seal, data for drawing normal image is generated, and if the target is a medium St which is a transfer sheet such as a tattoo sheet, data for drawing reversed image is generated.

As a result, the data for drawing the nail design on the medium Sn or St or the medium P by the drawing head 41 is generated.

Since other configurations are the same as those of the first embodiment, the same members are denoted by the same reference numerals, and description thereof is omitted.

Figure 11:
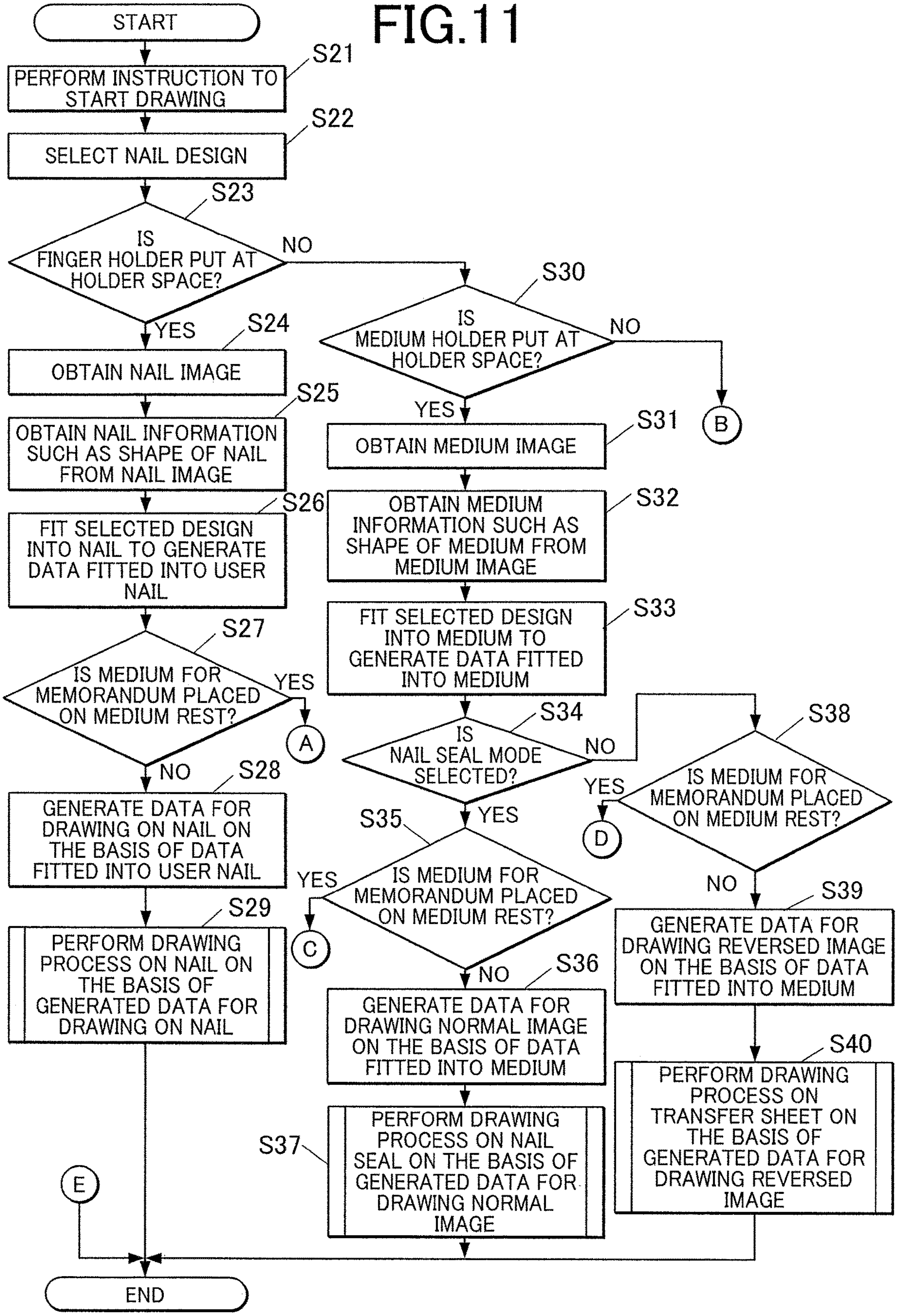
FIG. 11 is a flowchart illustrating a drawing process by the drawing apparatus according to the second embodiment.
Figure 12:
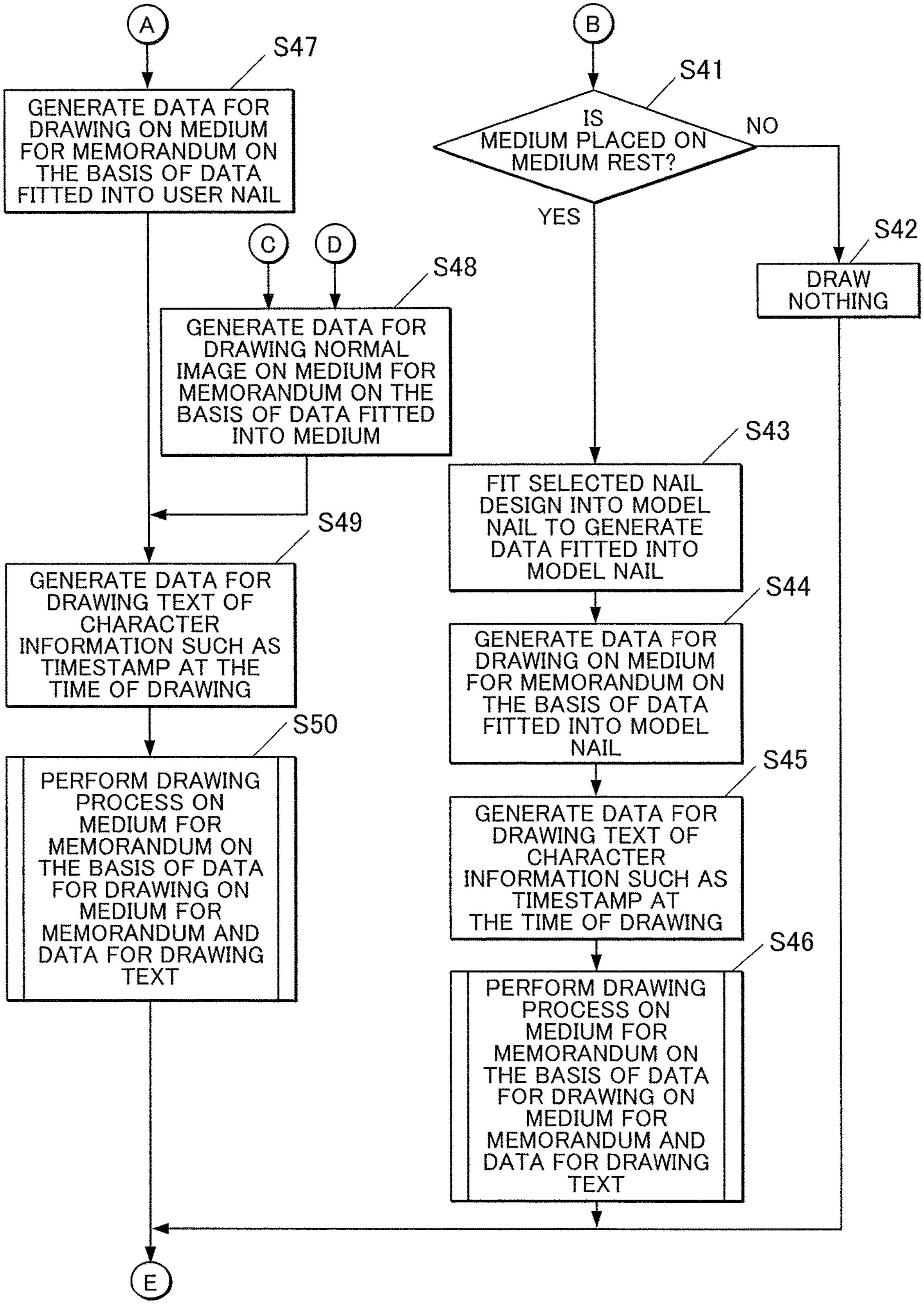
FIG. 12 is a flowchart illustrating a drawing process by the drawing apparatus according to the second embodiment.

Next, with reference to FIG. 11 and FIG. 12, the process of the nail printing apparatus 1 in the present embodiment will be described.

First, as in the first embodiment, an instruction to start drawing is input (step S21), and the user selects a nail design (step S22). The controller (processor) 81 determines whether or not the finger holder 30 is mounted in the holder space 37 (step S23). If the finger holder 30 is mounted in the holder space 37 (step S23; YES), the controller (processor) 81 generates data for drawing on nail according to the nail T of the target nail U1 held by the finger holder 30 and causes the drawing unit 40 to draw on the nail T on the basis of the generated data. Descriptions of Steps S24 to S29 will be omitted because they are the same as those of steps S4 to S9 in FIG. 5 of the first embodiment.

If the finger holder 30 is not mounted in the holder space 37 (step S23; NO), subsequently, the controller (processor) 81 determines whether or not the medium holder 60 is mounted in the holder space 37 (step S30). If the medium holder 60 is mounted in the holder space 37 (step S30; YES), the controller (processor) 81 causes the image capturing unit 50 to photograph an image of the medium S held by the medium holder 60 (step S31). The controller (processor) 81 as the medium-information detector 813 obtains medium information such as the shape of the medium S from the medium image (step S32). Furthermore, the controller (processor) 81 fits the selected nail design into the shape of the medium, and generates data fitted into medium (step S33).

The controller (processor) 81 as the medium-information detector 813 determines whether or not the user has selected a nail seal mode (step S34). If the user has selected a nail seal mode (step S34; YES), the controller (processor) 81 further determines whether or not the medium P such as a medium for memorandum is placed on the medium rests 35 (step S35). If the medium P such as a medium for memorandum is not placed on the medium rests 35, that is, if the target is only the medium Sn held by the medium holder 60 (step S35; NO), the controller (processor) 81 as the medium-drawing-data generator 819 generates data for drawing normal image on the basis of the data fitted into medium (step S36). The controller (processor) 81 causes the drawing unit 40 to draw on the nail seal (medium Sn) on the basis of the generated data for drawing normal image (step S37).

On the other hand, if the user does not select a nail seal mode, that is, a transfer sheet mode is selected to generate a tattoo sheet and the like (step S34; NO), the controller (processor) 81 further determines whether or not the medium P such as a medium for memorandum is placed on the medium rests 35 (step S38). If the medium P such as a medium for memorandum is not placed on the medium rests 35, that is, if the target is only the medium St held by the medium holder 60 (step S38; NO), the controller (processor) 81 as the medium-drawing-data generator 819 generates data for drawing reversed image on the basis of the data fitted into medium (step S39). The controller (processor) 81 causes the drawing unit 40 to draw on the transfer sheet such as a tattoo sheet (medium St) on the basis of the generated data for drawing reversed image (step S40).

If the medium holder 60 also is not mounted in the holder space 37 (step S30; NO), the controller (processor) 81 determines whether or not the medium P such as a medium for memorandum is placed on the medium rests 35 (step S41).

If the medium P such as a medium for memorandum is not placed on the medium rests 35 (step S41; NO), the controller (processor) 81 determines that no target is set in the drawing apparatus 200 and ends the process without drawing anything (step S42). In this case, as in the first embodiment, attention may be given to the user by causing the display 13 to display a message and the like prompting to set a target such as the target finger U1 and the medium P and S.

On the other hand, if medium P such as a medium for memorandum is placed on the medium rests 35 (step S41; YES), the controller (processor) 81 fits the selected nail design into the shape of the model nail Tm prepared in advance to generate data fitted into model nail (step S43).

Then, the controller (processor) 81 as the medium-drawing-data generator 819 generates data for drawing on medium for memorandum on the basis of the data fitted into model nail (step S44).

The controller (processor) 81 as the medium-drawing-data generator 819 generates the data for drawing text which is a data for drawing character information such as a timestamp at the time of the drawing operation (step S45).

On the basis of the generated data for drawing on medium for memorandum and the data for drawing text, the controller (processor) 81 causes the drawing unit 40 to draw on the medium P which is a medium for memorandum (step S46).

On the other hand, if the finger holder 30 is mounted in the holder space 37 (step S23; YES) and if the medium P such as a medium for memorandum is placed on the medium rests 35 (step S27; YES), the controller (processor) 81 as the medium-drawing-data generator 819 generates data for drawing on medium for memorandum on the basis of the data fitted into user nail including a nail design fitted into the nail T of the user held by the finger holder 30.

Furthermore, the controller (processor) 81 as the medium-drawing-data generator 819 generates the data for drawing text, which is a data for drawing character information such as a timestamp at the time of the drawing operation (step S49).

On the basis of the generated data for drawing on medium for memorandum and the data for drawing text, the controller (processor) 81 causes the drawing unit 40 to draw on the medium P which is a medium for memorandum (step S50).

If the finger holder 30 is mounted in the holder space 37 (step S23; YES) and if the medium P such as a medium for memorandum is placed on the medium rests 35 (step S27; YES), the controller (processor) 81 as the medium-drawing-data generator 819 generates data for drawing normal image on the basis of the data fitted into medium (step S48) whether or not the nail seal mode is selected (that is, transfer sheet mode is selected). If the transfer sheet mode is selected and if the reversed image actually drawn on the transfer sheet (medium St) is desired to be left also on the medium for memorandum (medium P), data for drawing reversed image may be generated.

The controller (processor) 81 as the medium-drawing-data generator 819 generates the data for drawing text, which is a data for drawing character information such as a timestamp at the time of the drawing operation (step S49).

On the basis of the generated data for drawing on medium for memorandum and the data for drawing text, the controller (processor) 81 causes the drawing unit 40 to draw on the medium P which is a medium for memorandum (step S50).

Figure 13A:
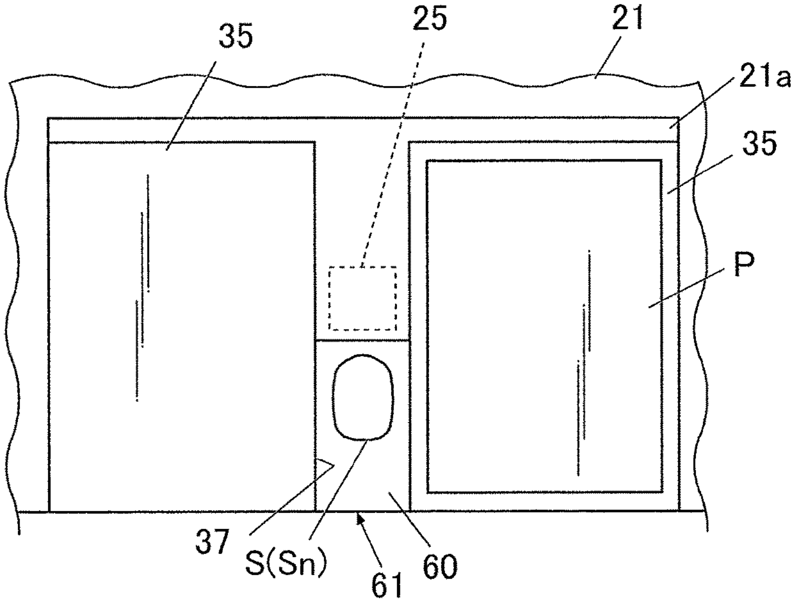
FIG. 13A is an exemplary plan view of a drawable area in the case where a nail seal which is a medium and a medium for memorandum as a medium for recording are set in the drawable area.
Figure 13B:
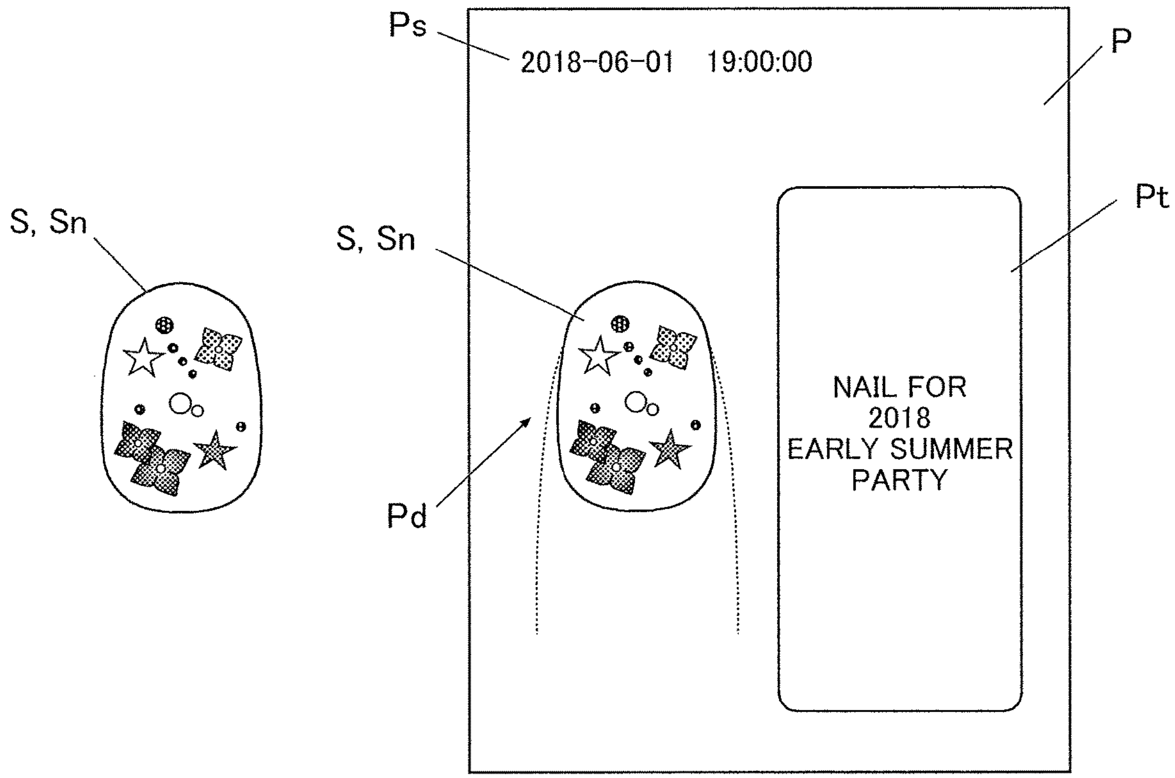
FIG. 13B is an exemplary plan view of a nail seal and a medium for memorandum after a drawing process.

FIG. 13A is a plan view of the drawable area 21*a* in the case where the medium holder 60 holding the medium Sn (a nail seal) is mounted in the holder space 37 and medium P such as medium for memorandum is placed on the medium rests 35. FIG. 13B shows an example of drawing when the drawing process was performed in the state shown in FIG. 13A.

In this case, as shown in FIG. 13B, the nail design is drawn on the nail seal (medium Sn) held by the medium holder 60, and the nail design is also drawn on the medium for memorandum (medium P) placed on the medium rests 35. In this case, a normal image of the nail design fitted into the nail seal (medium Sn) is drawn on the medium for memorandum (medium P). Furthermore, the timestamp Ps indicating the date and time of the drawing operation, the text information Pt such as comments input by the user through the operation unit 12 are also drawn on the medium for memorandum (medium P) with the normal image of the nail design.

Figure 14A:
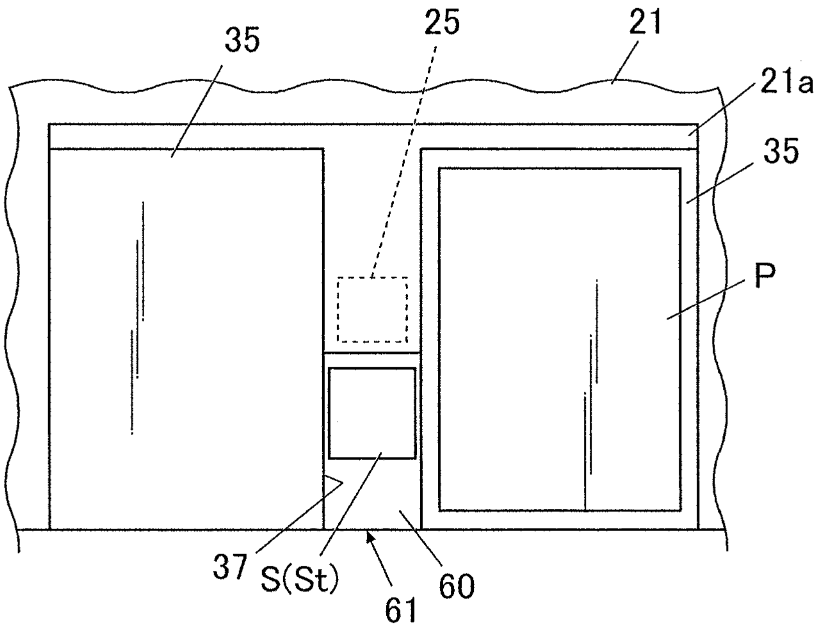
FIG. 14A is an exemplary plan view of a drawable area in the case where a tattoo sheet which is a medium for recording and a medium for memorandum as a medium for recording are set in the drawable area.
Figure 14B:
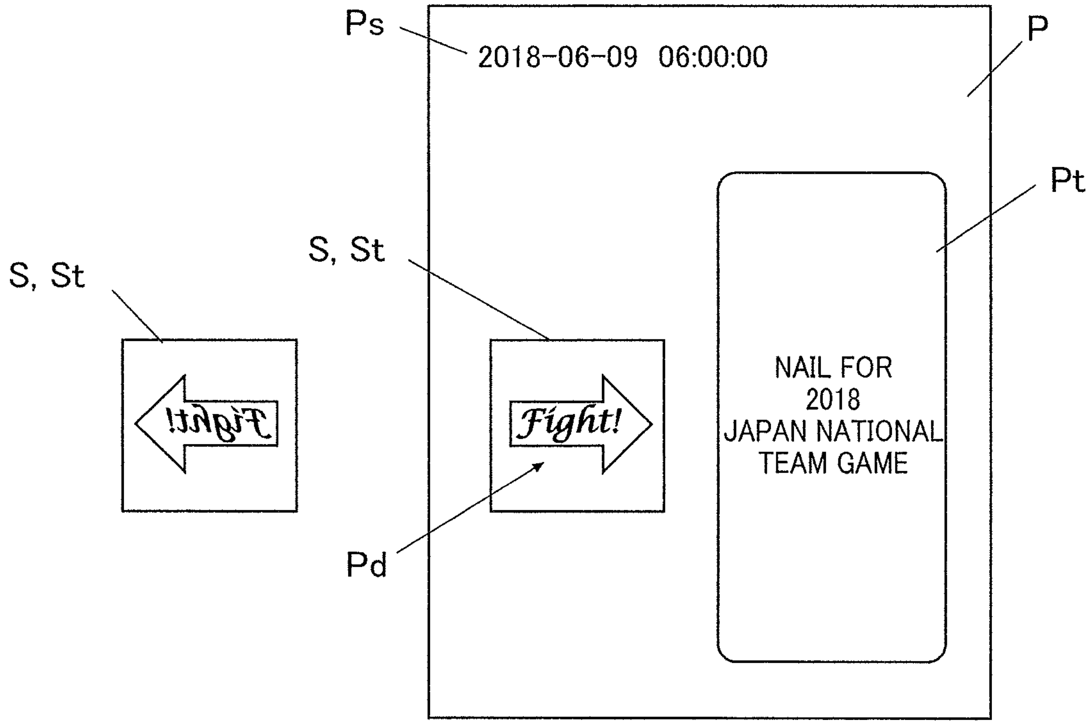
FIG. 14B is an exemplary plan view of the tattoo sheet and the medium for memorandum after a drawing process.

FIG. 14A is a plan view of the drawable area 21*a* in the case where the medium holder 60 holding the medium St (a transfer sheet) is mounted in the holder space 37 and the medium P such as a medium for memorandum is placed on the medium rests 35. FIG. 14B shows an example of drawing when the drawing process was performed in the state shown in FIG. 14A.

In this case, as shown in FIG. 14B, the nail design is drawn on the transfer sheet (medium St) held by the medium holder 60, and the nail design is also drawn on the medium for memorandum (medium P) placed on the medium rests 35. In this case, if the same reversed image as that drawn on the transfer sheet (medium St) is also drawn on the medium for memorandum (medium P), the medium for memorandum is not preferable as a recording medium because it is difficult to grasp the image later. Therefore, as shown in FIG. 14B, a normal image of the nail design fitted into the transfer medium (medium St) is preferably drawn on the medium for memorandum (medium P). Furthermore, the timestamp Ps indicating the date and time of the drawing operation, the text information Pt such as comments input by the user from the operation unit 12 are also drawn on the medium for memorandum (medium P) with the normal image of the nail design.

Thus, according to the present embodiment, it is possible to perform drawing automatically according to the target without various settings by the user.

Since other points are the same as those of the first embodiment, description thereof is omitted.

As described above, according to the present embodiment, in addition to the effects by the first embodiment, the following effects can be obtained.

In the present embodiment, in the drawable area 21*a* is provided a holder space 37 in which the finger holder 30 for holding the target finger U1 and the medium holder 60 for holding the medium S is mounted selectively and removably. If the finger holder 30 holding the nail T of the target finger U1 is mounted in the holder space 37, the controller (processor) 81 generates data for drawing according to the nail T of the target finger U1, and if the medium holder 60 holding the medium S is mounted in the holder space 37, the controller (processor) 81 generates data for drawing according to the medium S.

As a result, one apparatus can be widely utilized for various purposes of, for example, not only nail printing on the nail T but also drawing on a target such as a nail seal.

In addition, users reluctant to perform nail printing directly on their nails T can also enjoy applying nail design easily with a nail seal and the like.

Even in drawing on various targets as described above, the user can enjoy nail printing easily without time or effort because various targets are identified automatically to perform drawing according to each target.

In addition, in the present embodiment, the medium S held by the medium holder 60 includes a nail seal (medium Sn) and a transfer sheet (medium St). When the medium Sn is a nail seal, the controller (processor) 81 generates data for drawing a normal image. When the medium St is a transfer sheet, the controller (processor) 81 generates data for drawing a reversed image.

As a result, one apparatus can be widely utilized for various purposes of, for example, not only drawing on the medium Sn such as a nail seal as a target on which the same normal image as that drawn on the nail T is drawn, but also drawing on the medium St such as a transfer sheet as a target on which a reversed image is drawn.

Even in drawing on various targets as described above, the user can enjoy nail printing easily without time or effort because the drawing apparatus 200 according to the present embodiment identifies various targets automatically to perform drawing according to each target without settings and the like by the user.

The above embodiments should not be construed to limit the present invention and may be appropriately modified within the gist of the present invention.

For example, although not specifically described in the above-described embodiments, at the finger fixing unit 3 according to the first embodiment and at the back of the finger holder according to the second embodiment, a nail rest and the like on which the tip of the nail T is placed so that the tip of the nail T is placed on the nail rest.

In such a case, the height position of the nail T can be more accurately determined and can be also more accurately matched with the height position of the surface of the medium P.

According to the above embodiments, target fingers U1 are to be inserted one by one. However, it is also possible to provide a finger fixing unit (the finger fixing unit in the first embodiment) or a finger holder (the finger holder in the second embodiment) which can hold and fix a plurality of target fingers U1 at the same time so that the drawing process can be simultaneously performed on a plurality of target fingers U1.

Furthermore, according to the above-described embodiments, the target detector 814 (the nail-information detector 812 and the medium-information detector 813) determines the presence or absence of the target and the type thereof, by analyzing the image photographed by the image capturing unit 50, however, the method of determining the presence or absence of a target and the type is not limited thereto.

For example, a detector such as a contact sensor may be provided to detect the presence or absence of the target finger U1 and medium P or S (Sn or St) in the finger fixing unit 3 according to the first embodiment, the finger holder according to the second embodiment, the medium rests 35, and the like so that the presence or absence of the target can be detected.

Furthermore, if the standard size and the like are set regarding the medium P or S (Sn or St) in advance, the target detector 814 detects only the presence or absence of the placed medium P or S (Sn or St) from the image and the like obtained by the image capturing unit 50, for example. If there is placed a medium P or S (Sn or St), the drawing process is performed within a predetermined range. As a result, it is possible to perform drawing in an appropriate range.

In the second embodiment, when the target is the medium Sn such as a nail seal, the nail design is fitted into the shape of the nail seal to generate data for drawing on a medium Sn such as a nail seal or the data for drawing on the medium P such as medium for memorandum, however, the nail design is fitted not only into the shape of the nail seal.

For example, the nail design may be fitted into the shape of the nail T of the user, the model nail Tm, so that data for drawing on the medium P such as medium for memorandum is generated.

The nail design may be fitted into the shape of the user's nail T and the like, so that the data for drawing on a medium Sn such as a nail seal is generated and thin outline of the nail T of the user are drawn.

As a result, when the medium Sn and the nail T of the user do not match in size or shape, for example, when the medium Sn such as a nail seal is larger than the nail T of the user, the user can easily cut out the medium Sn such as a nail seal into a shape which fits the nail T of the user for use after drawing.

In the second embodiment, the guide rails 38 are provided on the sides of the holder space 37, and the guides 36 and 66 engaged with the guide rails are provided on the sides of the finger holder 30 and the medium holder 60. The configuration for stably sliding the finger holder 30 and the medium holder 60 in the Y direction is not limited thereto and other configurations may be adopted.

Furthermore, in the second embodiment, there is provided a holder detector 25 which detects whether the holder mounted in the holder space 37 is the finger holder 30 or the medium holder 60 by reading the member identification portion. However, it is not necessary to provide the member identification portion and the holder detector 25.

For example, the type of the holder mounted in the holder space 37 may be detected only by analyzing the image obtained by the image capturing unit 50.

As a result, since the holder detector 25 is not provided, the cost of apparatus can be reduced.

In the second embodiment, the finger holder 30, the medium holder 60, and the medium rests 35 simply place or hold the target finger U1 and the medium P, Sn, or St, however, the portions to set the target finger U1 and the medium P, Sn, or St are not limited to the configuration described in the above embodiment. For example, they may have a mechanism for positively fixing and holding the target finger U1 and the medium P, Sn, or St.

In each of the above embodiments, the drawing head 41 of inkjet system is provided as the drawing head 41 of the drawing apparatus 1 and 200, however, the configuration of the drawing head 41 is not limited thereto.

For example, it is possible to provide a pen holder holding a pen which performs the drawing process by attaching a nib to the surface of the nail T, so that the drawing process can be performed using the pen. Furthermore, it is possible to provide both a drawing head of the ink jet system as in the present embodiments and the pen holder holding a pen for drawing, so that the drawing process may be performed using a plurality of drawing means.

Furthermore, a drying unit including a heater and/or a fan for drying the ink after drawing may be provided in the drawing apparatus 1 and 200.

In each of the above-described embodiments, the single drawing apparatuses 1 and 200 have the entire functions. However, for example, the drawing apparatus may work with an external terminal device such as a smartphone, so that the external terminal device functions as the control device to control drawing, the operation unit, and the like, and the drawing apparatus functions as a system including only drawing head 41 and the like to perform the drawing process.

In this case, it is convenient that the configuration of the drawing apparatus can be simplified, and that text information Pt and the like drawn on the medium P can also be inputted through a keyboard or the like of the terminal apparatus.

Furthermore, the nail design data may not be stored in the storage 82 of the drawing apparatus but may be stored in the storage unit of the terminal apparatus. Furthermore, if it is possible to use design data and the like stored in an external server and the like which the terminal device can access through various networks, the number of nail designs drawable by the drawing apparatus can be dramatically increased.

Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A drawing apparatus comprising:

a processor determining, in response to detecting information on an image of a target on which drawing is to be performed and which is placed in a drawable area, whether a type of the target is one of a nail of a finger and a medium for recording which is not the nail of the finger, and generating data for drawing according to the detected type of the target; and a drawing head drawing on the target placed in the drawable area based on the data for drawing generated by the processor.

2. The drawing apparatus according to claim 1, wherein the processor determines the type of the target placed in the drawable area by detecting an outline of the target.

3. The drawing apparatus according to claim 1, wherein:

if the nail of the finger is detected as the target, the processor generates the data for drawing according to the nail of the finger, if the medium for recording is detected as the target, the processor generates the data for drawing according to the detected medium for recording, and if both the nail of the finger and the medium for recording are detected as the target, the processor generates the data for drawing according to the detected nail of the finger and the detected medium for recording.

4. The drawing apparatus according to claim 1, further comprising a finger fixing unit for fixing the finger and a medium rest for placing the medium for recording, wherein a height of a surface of the nail of the finger fixed in the finger fixing unit and a height of a surface of the medium for recording placed on the medium rest are on a same plane.

5. The drawing apparatus according to claim 1, wherein:

a holder space is provided in the drawable area, a finger holder holding the finger and a medium holder holding the medium for recording can be selectively and removably mounted in the holder space, if the finger holder holding the finger is mounted in the holder space, the processor generates the data for drawing according to the nail of the finger, and if the medium holder holding the medium for recording is mounted in the holder space, the processor generates the data for drawing according to the medium for recording.

6. The drawing apparatus according to claim 5, wherein:

the medium for recording held by the medium holder can be selected from among a nail seal and a transfer sheet, if the medium for recording is a nail seal, the processor generates data for drawing a normal image, and if the medium for recording is a transfer sheet, the processor generates data for drawing a reversed image.

7. The drawing apparatus according to claim 1, wherein the data for drawing corresponding to the medium for recording includes image data for drawing on the nail and optional character data.

8. The drawing apparatus according to claim 7, wherein the optional character data includes information on a time when the drawing head performed drawing based on the data for drawing.

9. A drawing method by a drawing apparatus, comprising:

determining, in response to detecting information on an image of a target on which drawing is to be performed and which is placed in a drawable area, whether a type of the target is one of a nail of a finger and a medium for recording which is not the nail of the finger;

generating data for drawing according to the detected type of the target; and drawing on the target detected in the drawable area based on the generated data for drawing.

10. A non-transitory computer-readable readable recording medium storing a program for causing a processor of a drawing apparatus provided with a drawing head to execute processes comprising:

determining, in response to detecting information on an image of a target on which drawing is to be performed and which is placed in a drawable area, whether a type of the target is one of a nail of a finger and a medium for recording which is not the nail of the finger;

generating data for drawing according to the detected type of the target; and drawing on the target detected in the drawable area based on the generated data for drawing.

11. A drawing apparatus comprising:

a processor generating data for drawing according to a type of a target on which drawing is performed, the target being placed in a drawable area; and a drawing head drawing on the target placed in the drawable area based on the data for drawing generated by the processor, wherein:

the target includes at least one of a nail of a finger and a medium for recording which is not the nail of the finger, if the nail of the finger is detected as the target, the processor generates data for drawing according to the nail of the finger, if the medium for recording is detected as the target, the processor generates data for drawing according to the detected medium for recording, and if both the nail of the finger and the medium for recording are detected as the target, the processor generates data for drawing according to the detected nail of the finger and the detected medium for recording.

* * * * *